US012087231B2

(12) United States Patent
Park et al.

(10) Patent No.: US 12,087,231 B2
(45) Date of Patent: Sep. 10, 2024

(54) SCAN SIGNAL DRIVER AND DISPLAY DEVICE INCLUDING THE SAME

(71) Applicant: Samsung Display Co., LTD., Yongin-si (KR)

(72) Inventors: Jae Hyun Park, Yongin-si (KR); Hyeon Sik Kim, Yongin-si (KR); Hye Seok Na, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/466,047

(22) Filed: Sep. 13, 2023

(65) Prior Publication Data

US 2024/0242679 A1 Jul. 18, 2024

(30) Foreign Application Priority Data

Jan. 12, 2023 (KR) ........................ 10-2023-0004483

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2310/0267* (2013.01); *G09G 2330/06* (2013.01)

(58) Field of Classification Search
CPC ................... G09G 3/3266; G09G 3/32; G09G 2310/0267; G09G 2330/06
See application file for complete search history.

(56) References Cited

U.S. PATENT DOCUMENTS

| | | | | |
|---|---|---|---|---|
| 9,013,846 | B2 | 4/2015 | Duan et al. | |
| 10,930,231 | B2 | 2/2021 | Kim et al. | |
| 11,844,253 | B2 * | 12/2023 | Feng | H10K 59/1213 |
| 2021/0150960 | A1 * | 5/2021 | Kim | G09G 3/3266 |
| 2023/0252951 | A1 * | 8/2023 | Hara | H01L 27/1225 345/87 |

FOREIGN PATENT DOCUMENTS

| | | |
|---|---|---|
| KR | 10-2005-0050240 | 5/2005 |
| KR | 10-0877479 | 1/2009 |
| KR | 10-2020-0005223 | 1/2020 |

* cited by examiner

*Primary Examiner* — Abhishek Sarma
(74) *Attorney, Agent, or Firm* — KILE PARK REED & HOUTTEMAN PLLC

(57) ABSTRACT

A design for a scan driver and a display device including the scan driver that is more resilient to electrostatic discharge. Thin film transistors within a stage are designed differently depending on whether or not a gate of the transistor is connected to an external source. Transistors whose gate is connected to an external source is specially designed to withstand electrostatic discharge applied to the gate thereof by one or more of increasing a number of channel areas, decreasing a length of an ohmic bridge, including a resistive element to the gate, decreasing a width of a channel areas, and increasing a width of the active layer.

20 Claims, 13 Drawing Sheets

SCAN SIGNAL DRIVER AND DISPLAY DEVICE INCLUDING THE SAME

CROSS-REFERENCE TO RELATED APPLICATIONS

This application claims priority under 35 U.S.C. § 119 from Korean Patent Application No. 10-2023-0004483 filed on Jan. 12, 2023 in the Korean Intellectual Property Office, the entire contents of which are incorporated herein by reference.

BACKGROUND

1. Technical Field

The disclosure relates to a scan signal driver and a display device including the same.

2. Description of the Related Art

In case that a pulse potential caused by Electro Static Discharge (ESD) may be input to a display device from the outside through an external input terminal (or a pad portion), deterioration of display quality or an erroneous operation of an internal circuit may occur in the display device due to noise. In case that a very high potential caused by ESD is input to the display device, a functional element constituting the internal circuit may be destroyed. The potential caused by ESD may be directly input to an input line or a line provided to a pixel, etc., as well as an external input terminal.

In order to solve this problem, an electro static protection circuit for protecting the internal circuit from a pulse potential caused by an ESD may be employed in the display device. However, in case that the conventional electro static protection circuit is applied to a circuit in which an oxide thin film transistor is included, problems occur in that a manufacturing process and a circuit structure may be complicated and production costs may be increased.

SUMMARY

Aspects of the disclosure provide a scan signal driver and a display device including the same in which an erroneous operation due to the inflow of static electricity may be reduced.

According to an embodiment of the disclosure, a scan signal driver may include a plurality of stages that sequentially outputs a plurality of scan signals based on a plurality of driving voltages and a plurality of external signals received by the plurality of stages, wherein each of the plurality of stages may include a plurality of transistors and at least one specific node electrically connected to ones of the plurality of transistors, the plurality of transistors may include a plurality of first transistors and a plurality of second transistors, each of the plurality of first transistors may include a first gate electrode that receives any one of the plurality of external signals, a first semiconductor layer may overlap at least a portion of the first gate electrode, the first semiconductor layer may include 'n' number of channel areas, and a first source electrode and a first drain electrode may be spaced apart from each other by a distance, the first gate electrode may be disposed at a center between the first source electrode and the first drain electrode, and each of the plurality of second transistors may include a second gate electrode electrically connected to any one of the at least one specific node, a second semiconductor layer may overlap at least a portion of the second gate electrode, the second semiconductor layer may include 'm' number of channel areas smaller than the 'n' number of channel areas, and a second source electrode and a second drain electrode may be spaced apart from each other by a distance, the second gate electrode being may be disposed at a center between the second source electrode and the second drain electrode.

The plurality of external signals may include at least one of a scan start signal, a carry signal input from a previous stage, a reset signal input from subsequent stage, and a scan clock signal.

The driving voltages may include at least one of a high potential voltage, a first low potential voltage, and a second low potential voltage, and the second low potential voltage has a potential lower than that of the first low potential voltage.

In each of the plurality of first transistors, the first gate electrode may extend in a first direction, and the 'n' number of channel areas of the first semiconductor layer may extend in a second direction intersecting the first direction, wherein ones of the 'n' number of channel areas may be spaced apart from each other in the first direction, and in each of the plurality of second transistors, the second gate electrode may extend in the first direction, and the 'm' number of channel areas of the second semiconductor layer may extend in the second direction, wherein ones of the 'm' number of channel areas may be spaced apart from each other in the first direction.

The first semiconductor layer of each of the plurality of first transistors may include a first source area electrically connected to the first source electrode, the first source area may be doped with impurities, a first drain area may be electrically connected to the first drain electrode, the first drain area may be doped with impurities, a first channel area may be disposed between the first source area and the first drain area, the first channel area may overlap the first gate electrode, and an ohmic bridge area may be disposed between the first channel area and each of the first source area and the first drain area, the ohmic bridge area may have a first length, and the second semiconductor layer in each of the plurality of second transistors may include a second source area electrically connected to the second source electrode, the second source area may be doped with impurities, a second drain area may be electrically connected to the second drain electrode, the second drain area may be doped with impurities, a second channel area may be disposed between the second source area and the second drain area, the second channel area may overlap the second gate electrode, and an ohmic bridge area may be disposed between the second channel area and each of the second source area and the second drain area, the ohmic bridge area may have a second length longer than the first length.

The scan driver may also include a resistive element disposed between the first gate electrode of each of the first transistors and a supply line that supplies any one of the plurality of external signals, wherein the resistive element may be absent between any of the at least one specific node and the second gate electrode of any of the plurality of second transistors.

The resistive element of each of the first transistors may include an impurity semiconductor, the impurity semiconductor and the first semiconductor layer may be disposed on a same layer, the impurity semiconductor may be doped with impurities.

The resistive element of each of the first transistors may be electrically connected to the supply line through a first contact hole, and the resistive element may be electrically connected to the first gate electrode through a second contact hole.

A channel length of the first semiconductor layer of each of the first transistors may be shorter than a channel length of the second semiconductor layer of each of the second transistors.

A channel width of the first semiconductor layer of each of the first transistors may be greater than a channel width of the second semiconductor layer of each of the second transistors.

According to an embodiment of the disclosure, a display device may include a display panel that may include a plurality of scan signal lines and a plurality of data lines, and a scan signal driver that drives the plurality of scan signal lines. The scan signal driver may include a plurality of stages that sequentially outputs a plurality of scan signals based on a plurality of driving voltages and a plurality of external signals received by the plurality of stages, each of the plurality of stages may include a plurality of transistors and at least one specific node electrically connected to ones of the plurality of transistors, the plurality of transistors may include a plurality of first transistors and a plurality of second transistors, each of the plurality of first transistors may include a first gate electrode that receives any one of the plurality of external signals, a first semiconductor layer may overlap at least a portion of the first gate electrode, the first semiconductor layer may include 'n' number of channel areas, and a first source electrode and a first drain electrode may be spaced apart from each other by a distance, the first gate electrode may be disposed at a center between the first source electrode and the first drain electrode, and each of the plurality of second transistors may include a second gate electrode electrically connected to any one of the at least one specific node, a second semiconductor layer may overlap at least a portion of the second gate electrode, the second semiconductor layer may include 'm' number of channel areas smaller than the 'n' number of channel areas, and a second source electrode and a second drain electrode may be spaced apart from each other by a distance, the second gate electrode may be disposed at a center between the second source electrode and the second drain electrode.

The plurality of external signals may include at least one of a scan start signal, a carry signal input from a previous stage, a reset signal input from a subsequent stage, and a scan clock signal.

The driving voltages may include at least one of a high potential voltage, a first low potential voltage, and a second low potential voltage, and the second low potential voltage may have a potential lower than that of the first low potential voltage.

The first gate electrode may extend in a first direction. The first semiconductor layer may include 'n' number of channel areas extending in a second direction perpendicular to the first direction and spaced apart from each other in the first direction. The second gate electrode may extend in the first direction. The second semiconductor layer may include 'm' number of channel areas extending in the second direction and spaced apart from each other in the first direction.

The first semiconductor layer of each first transistor may include a first source area electrically connected to the first source electrode, the first source area may be doped with impurities, a first drain area may be electrically connected to the first drain electrode, the first drain area may be doped with impurities, a first channel area may be disposed between the first source area and the first drain area, the first channel area may overlap the first gate electrode, and an ohmic bridge area may be disposed between the first channel area and each of the first source area and the first drain area, the ohmic bridge area may have a first length, and the second semiconductor layer of each of the plurality of second transistors may include a second source area electrically connected to the second source electrode, the second source area may be doped with impurities, a second drain area may be electrically connected to the second drain electrode, the second drain area may be doped with impurities, and a second channel area may be disposed between the second source area and the second drain area, the second channel area may overlap the second gate electrode, and an ohmic bridge area may be disposed between the second channel area and each of the second source area and the second drain area, the ohmic bridge area may have a second length that is longer than the first length.

Each of the plurality of first transistors may also include a resistive element disposed between a supply line of any one of the plurality of external signals and the first gate electrode, and each of the plurality of second transistors may be absent of the resistive element disposed between any of the at least one specific node and the second gate electrode.

The resistive element of each of the first transistors may include an impurity semiconductor, the impurity semiconductor and the first semiconductor layer may be disposed on a same layer, the impurity semiconductor layer may be doped with impurities.

The resistive element of each of the first transistors may be electrically connected to the supply line through a first contact hole, and may be electrically connected to the first gate electrode through a second contact hole.

A channel length of the first semiconductor layer of each of the first transistors may be shorter than a channel length of the second semiconductor layer of each second transistor.

A channel width of the first semiconductor layer of each first transistor may be greater than a channel width of the second semiconductor layer of each second transistor.

In the scan signal driver and the display device including the same according to the embodiments, an error operation due to the inflow of static electricity may be reduced.

Aspects of the disclosure may not be restricted to those set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
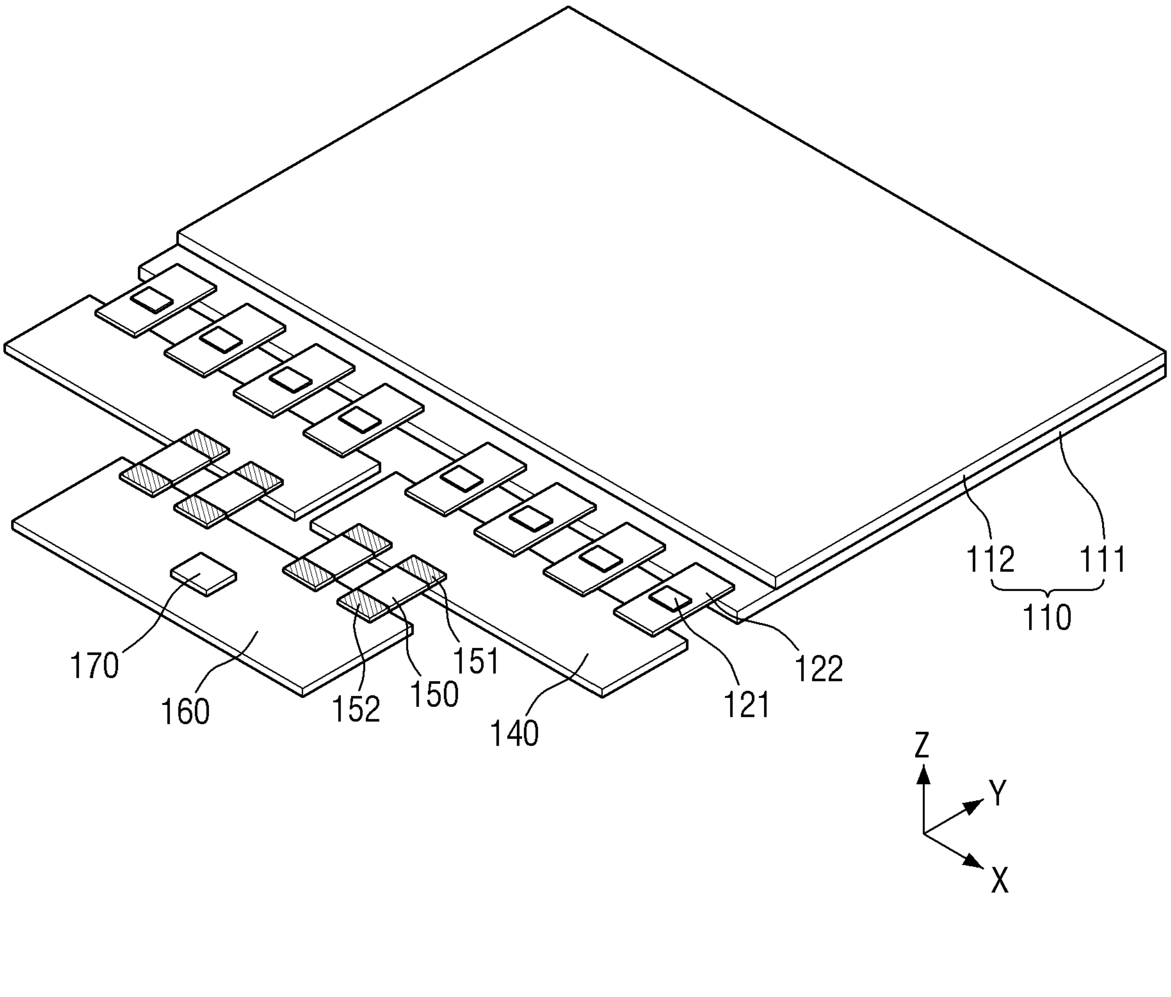
FIG. 1 is a perspective view illustrating a display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at the same time or predisposed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on." "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may be different directions that may not be perpendicular to one another.

For the purposes of this disclosure, "at least one of A and B" may be construed as A only, B only, or any combination of A and B. Also, "at least one of X, Y, and Z" and "at least one selected from the group consisting of X. Y, and Z" may be construed as X only, Y only, Z only, or any combination of two or more of X, Y, and Z. As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under." "lower," "above," "upper," "over," "higher." "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising." "includes," and/or "including." when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially." "about." and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, may not be necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, portion, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein. Hereinafter, embodiments of the disclosure will be described in detail with reference to the accompanying drawings.

Figure 2:
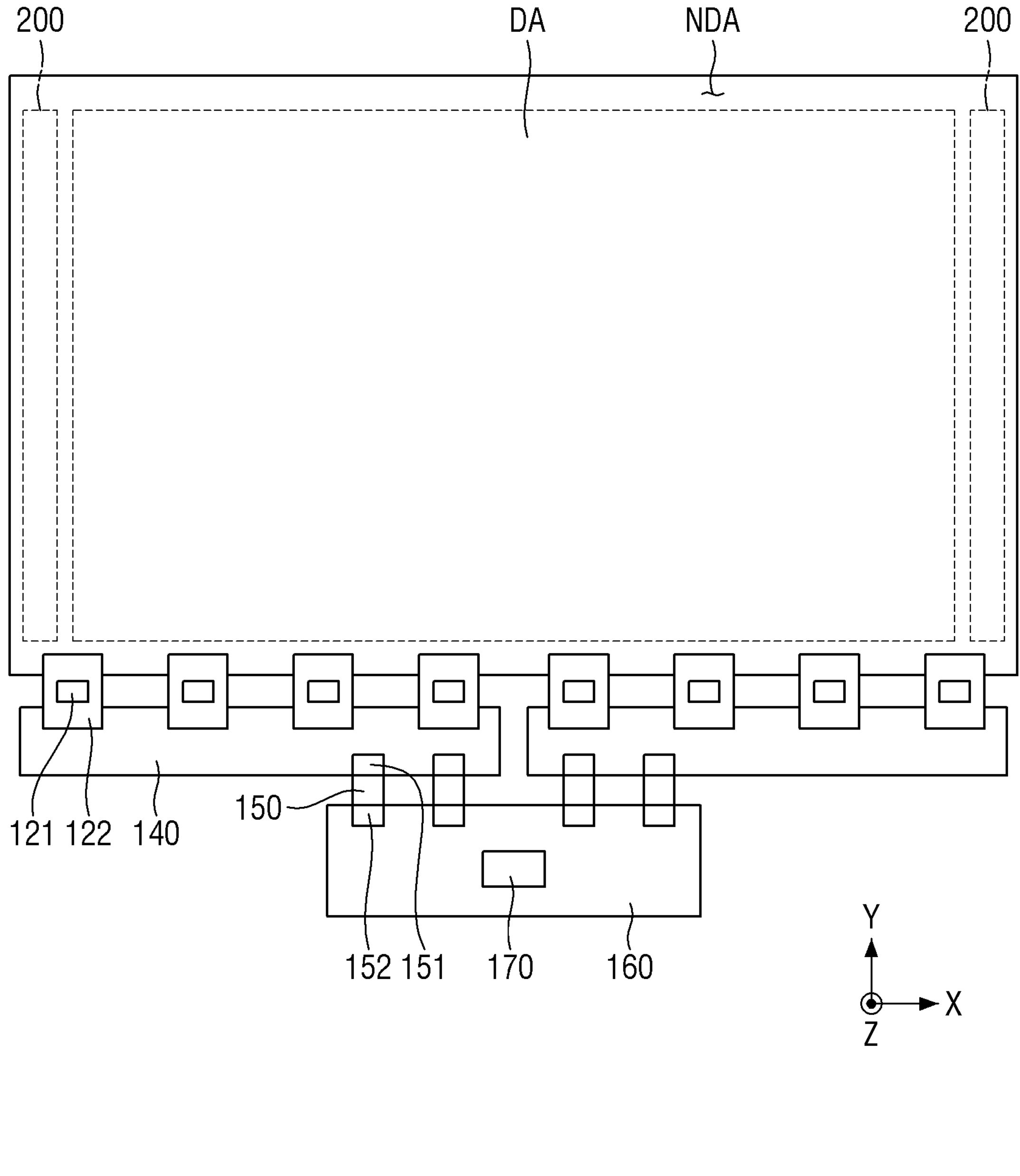
FIG. 2 is a plan view illustrating a display device according to an embodiment.
Figure 3:
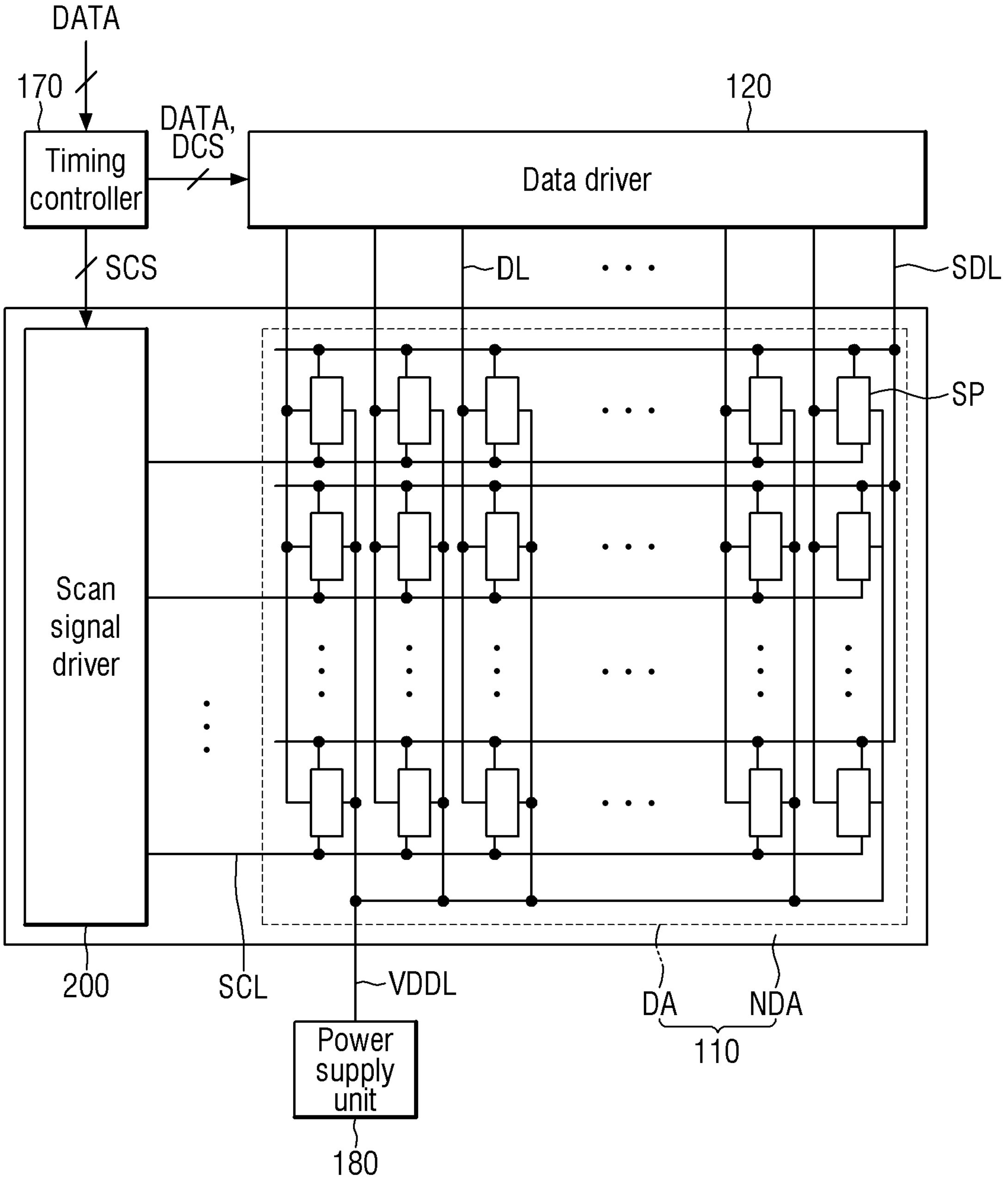
FIG. 3 is a block schematic diagram illustrating a display device according to an embodiment.

FIG. 1 is a perspective view illustrating a display device according to an embodiment, FIG. 2 is a plan view illustrating a display device according to an embodiment, and FIG. 3 is a block schematic diagram illustrating a display device according to an embodiment.

In the disclosure, "upper", "top" and "upper surface" refer to an upward direction based on a display panel 110, that is a Z-axis direction and "lower", "bottom" and "lower surface" refer to a downward direction based on the display panel 110, that is an opposite direction of the Z-axis direction. Also, "left side", "right side", "upper side" and "lower side" refer to a direction when the display panel 110 is viewed in a plan view. For example, "left side" refers to an opposite direction of X-axis direction, "right side" refers to the X-axis direction, "upper side" refers to Y-axis direction and "lower side" refers to an opposite direction of the Y-axis direction.

In the disclosure, a display device according to an embodiment may be a device that displays a moving image or a still image, and may be used as a display screen of portable electronic devices such as a mobile phone, a smart phone, a tablet personal computer (PC), a smart watch, a watch phone, a mobile communication terminal, an electronic diary, an electronic book, a portable multimedia player (PMP), a navigator and an ultra mobile PC (UMPC). Also, the display device according to an embodiment may be used as a display screen of various medium and large-sized products such as a television, a laptop computer, a monitor, an advertising board and a device for Internet of things (IoT). Hereinafter, the display device according to an embodiment may be illustrated as a medium and large-sized display device that includes multiple source drivers 121, but may not be limited thereto. Examples of the medium and large-sized display device include a television and a monitor, and examples of the small-sized display device include a smart phone and a tablet PC.

The display device according to an embodiment may be a small-sized display device that includes one source driver 121, and flexible films 122, source circuit boards 140 and first cables 150 may be omitted. In case that the display device according to an embodiment is a small-sized display device, the source driver 121 and a timing controller 170 may be integrated into one integrated circuit, so that the source driver 121 and the timing controller 170 may be disposed on one control circuit board 160 or may be adhered onto a first substrate 111 of the display panel 110.

Referring to FIGS. 1, 2 and 3, the display device includes a display panel 110, a data driver 120 including source drivers 121, flexible films 122, a source circuit board 140, first cables 150, a scan signal driver 200, a control circuit board 160, a timing controller 170 and a power supply part 180. The display panel 110 may have a rectangular shape in a plan view. For example, the display panel 110 may have a rectangular planar shape having long sides in a first direction (X-axis direction) and short sides in a second direction (Y-axis direction). A corner where the long side in the first direction (X-axis direction) meets the short side in the second direction (Y-axis direction) may be formed at a right angle or rounded to have a curvature. The planar shape of the display panel 110 may not be limited to a rectangular shape, and may be formed in another polygonal shape, a circular shape or an elliptical shape. Although FIGS. 1 and 2 illustrate that the display panel 110 may be formed to be flat, the disclosure may not be limited thereto. The display panel 110 may instead include a curved portion bent with a curvature.

The display panel 110 may include a first substrate 111 and a second substrate 112. The second substrate 112 may be disposed to face a first surface of the first substrate 111. The first substrate 111 and the second substrate 112 may be formed to be rigid or flexible. The first substrate 111 may be formed of glass or plastic. The second substrate 112 may be formed of glass, plastic, an encapsulation film, a barrier film, or a combination thereof. The second substrate 112 may instead be omitted.

The display panel 110 may be an organic light emitting display panel using an organic light emitting diode, a quantum dot light emitting display panel including a quantum dot light emitting layer, an inorganic light emitting display panel including an inorganic semiconductor, and a micro light emitting display panel using a micro light emitting diode (LED). Hereinafter, the display panel 110 will be described as being an organic light emitting display panel by way of example, but may not be limited thereto.

The display panel 110 may be divided into a display area DA in which subpixels SP may be arranged to display an image, and a non-display area NDA which may be a peripheral area of the display area DA. Scan signal lines SCL, data lines DL, sensing lines SDL and driving voltage supply lines VDDL, which may be electrically connected to subpixels SP, and the subpixels may be disposed in the display area DA. The scan signal lines SCL may be arranged and extended in the first direction (X-axis direction) in the display area DA. The data lines DL may be arranged and extended in the second direction (Y-axis direction) intersecting the first direction (X-axis direction) in the display area DA. The sensing line SDL may be extended in the first direction (X-axis direction), and the driving voltage supply line VDDL may be extended in the second direction (Y-axis direction) in the display area DA.

Each of the subpixels SP may be electrically connected to any one of the scan signal lines SCL, any one of the data lines DL, the sensing line SDL and the driving voltage supply line VDDL. Although FIG. 2 illustrates that each of the subpixels SP may be electrically connected to one scan signal line SCL and one data line DL, the disclosure may not be limited thereto. The subpixels SP may instead be commonly electrically connected to the sensing line SDL and the driving voltage supply line VDDL.

Each of the subpixels SP may include a switching transistor, a driving transistor, a sensing transistor, a capacitor and a light emitting element. The switching transistor may be turned on when a scan signal and a sensing signal are applied from the scan signal line SCL, and a data voltage input to the data line DL at a scan signal input period may be applied to a gate electrode of the driving transistor DT. The driving transistor DT may emit light by supplying a driving current to the light emitting element in accordance with the data voltage applied to the gate electrode.

The driving transistor, the switching transistor and the sensing transistor may be thin film transistors. The light emitting element may emit light in accordance with the driving current of the driving transistor. The light emitting element may be an organic light emitting diode that includes a first electrode, an organic light emitting layer and a second electrode. The capacitor may serve to uniformly maintain the data voltage applied to the gate electrode of the driving transistor DT. A detailed structure and operation characteristics of the subpixel SP will be described in more detail with reference to the accompanying drawings.

The non-display area NDA may be defined as an area external to the display area DA to an edge of the display panel 110. The scan signal driver 200 for applying scan signals to the scan signal lines SCL may be disposed in the non-display area NDA. The scan signal driver 200 outputs the scan signals to the scan signal lines SCL during an active period of each frame in accordance with the scan control signal SCS from the timing controller 170 and selectively outputs the sensing signals to the scan signal lines SCL during a vertical blank period. The scan control signal SCS may include a start signal, scan clock signals, a line selection signal, a holding control signal and a reset signal.

The scan signal driver 200 generates scan signals in accordance with the start signal and the scan clock signals during an active period of each frame and sequentially outputs the scan signals to the respective scan signal lines SCL. The scan signal driver 200 selectively generates sensing signals in accordance with the line selection signal, the holding control signal and the scan clock signals, and selectively outputs the sensing signals to the scan signal lines SCL. The scan signal driver 200 may be reset by a reset signal after the output of the sensing signals. In FIG. 2, the scan signal driver 200 may be formed at both sides of the display area DA, for example, in the non-display area NDA at left and right sides of the display area DA, but may not be limited thereto. For example, the scan signal driver 200 may be formed at one side of the display area DA, for example, in the non-display area NDA at the left or right side of the display area DA.

A side of each of the flexible films 122 may be attached onto the first surface of the first substrate 111 of the display panel 110, and another side thereof may be attached onto a surface of the source circuit board 140. In detail, since the size of the second substrate 112 may be smaller than that of the first substrate 111, a side of the first substrate 111 may be exposed without being covered by the second substrate 112. The flexible films 122 may be attached to a side of the first substrate 111 exposed without being covered by the second substrate 112. Each of the flexible films 122 may be attached onto the first surface of the first substrate 111 and a surface of the source circuit board 140 by using an anisotropic conductive film.

Each of the flexible films 122 may be a tape carrier package or a chip on film. The flexible films 122 may be bent toward a rear surface of the first substrate 111. The source circuit boards 140, the first cables 150 and the control circuit board 160 may be disposed on a rear surface of the display panel 110. Although FIGS. 1 and 2 illustrate eight flexible films 122 may be attached onto the first substrate 111 of the display panel 110, the number of flexible films 122 in the disclosure may not be limited thereto.

The source drivers 121 of the data driver 120 may be disposed on a surface of each of the flexible films 122. The source drivers 121 may be formed of an integrated circuit (IC). The data driver 120 converts digital video data DATA into analog data voltages in accordance with a source control signal DCS of the timing controller 170 and supplies the analog data voltages to the data lines DL of the display panel 110 through the flexible film 122.

The source circuit boards 140 may be electrically connected to the control circuit board 160 via the first cables 150, respectively. Each of the source circuit boards 140 may include first connectors 151 to be electrically connected to the first cables 150. The source circuit boards 140 may be flexible printed circuit boards or printed circuit boards. The first cables 150 may be flexible cables. On the other hand, the source drivers 121 may instead be packaged on the source circuit board 140, the control circuit board 160 or the first substrate 111 of the display panel 110 in a circuit on glass (COG) manner. Therefore, various modifications may be applied to the configuration of the source drivers 121 without limitation to FIGS. 1 and 2.

The control circuit board 160 may be electrically connected to the source circuit boards 140 via the first cables 150. To this end, the control circuit board 160 may include second connectors 152 to be electrically connected to the first cables 150. The control circuit board 160 may be a flexible printed circuit board or a printed circuit board.

Although FIGS. 1 and 2 illustrate that four first cables 150 connect the source circuit boards 140 with the control circuit board 160, the number of the first cables 150 in the disclosure may not be limited thereto. Although FIGS. 1 and 2 illustrate that two source circuit boards 140 may be provided, the number of source circuit boards 140 in the disclosure may not be limited thereto. In case that the number of the flexible films 122 may be small, the source circuit boards 140 may be omitted. The flexible films 122 may be directly electrically connected to the control circuit board 160.

The timing controller 170 may be disposed on one surface of the control circuit board 160. The timing controller 170 may be formed as an integrated circuit. The timing controller 170 receives digital video data and timing signals from a system-on-chip of a system circuit board. The timing controller 170 generates a source control signal DCS for controlling a driving timing of the source drivers 121 of the data driver 120 and a scan control signal SCS for controlling a driving timing of the scan signal driver 200 in accordance with the timing signals. The timing controller 170 outputs the scan control signal SCS to the scan signal driver 200, and outputs the digital video data DATA and the source control signal DCS to the data driver 120.

The power supply part 180 generates a first driving voltage and supplies the first driving voltage to the driving voltage supply line VDDL. The power supply part 180 may supply a second driving voltage to a cathode electrode of the organic light emitting diode included in each of the sub pixels SP. The first driving voltage may be a high potential voltage of a magnitude of a gate-on voltage for turn-on driving of an organic light emitting diode and a transistor, and may correspond to control voltage VON to be described below in conjunction with FIG. 4. The second driving voltage may be a low potential voltage of a magnitude of a gate-off voltage for turn-off driving of an organic light emitting diode and a transistor. Therefore, the first driving voltage may have a potential higher than that of the second driving voltage.

Figure 4:
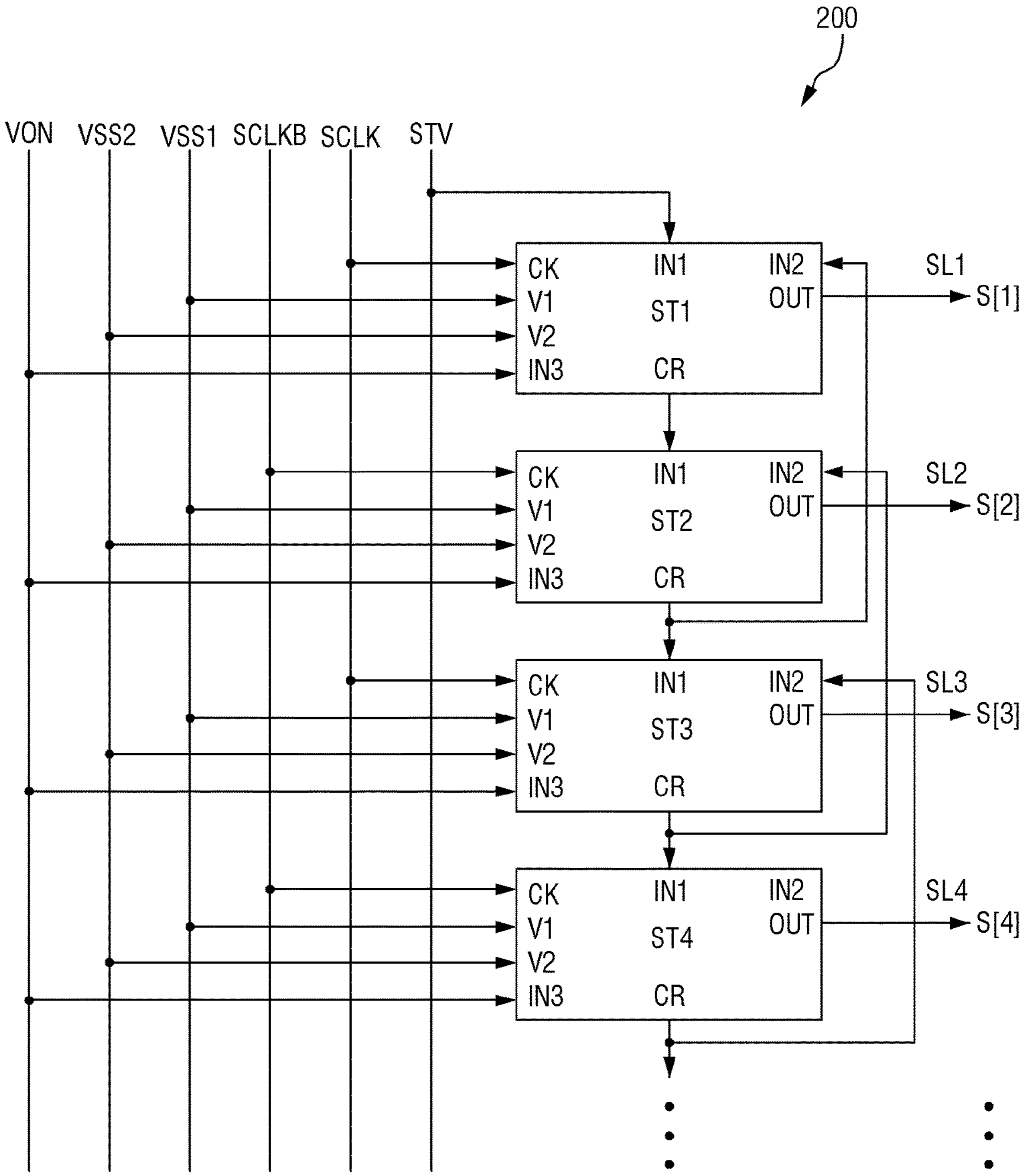
FIG. 4 is a view illustrating an example of a scan signal driver according to embodiments of the disclosure.

FIG. 4 is a view illustrating an example of a scan signal driver according to the embodiments of the disclosure. In the following description, the term "previous stages" means stages which may be positioned above a specific stage serving as a reference and generate scan signals having a phase earlier than that of a scan signal output from the specific stage. In the following description, the term "subsequent stages" means stages which may be positioned below a specific stage serving as a reference and generate scan signals having a phase later than that of a scan signal output from the specific stage.

Referring to FIG. 4, the scan signal driver 200 may include multiple stages ST1, ST2, ST3, ST4, . . . . Each of the stages ST1, ST2, ST3, ST4, . . . may receive multiple driving voltages and multiple external signals. Each of the stages ST1, ST2, ST3, ST4, . . . may output a scan signal (e.g., S[1] in FIG. 4) based on multiple driving voltages and multiple external signals, which may be input. The driving voltages may include at least one of a control voltage VON that may be a high potential voltage, a first power source VSS1 that may be a first low potential voltage, and a second power source VSS2 that may be a second low potential voltage, but the disclosure may not be limited thereto. The second low potential voltage may have a potential lower than the first low potential voltage. The external signals may include at least one of a scan start signal STV, a carry signal input from a previous stage, a reset signal input from a subsequent stage, or a scan clock signal (e.g., a first scan clock signal SCLK or a second scan clock signal SCLKB), but the disclosure may not be limited thereto.

The scan signal (e.g., S[1] in FIG. 4) output from each of the stages ST1, ST2, ST3, ST4, . . . may be supplied to the subsequent stage as a carry signal. Each of the stages may output the scan signal in response to the carry signal (e.g., a first carry signal) input from the previous stage. The first stage ST1 among the stages ST1, ST2, ST3, ST4, . . . may receive the scan start signal STV from the outside as the carry signal. The scan signal (e.g., S[1] in FIG. 4) output from each of the stages ST1, ST2, ST3, ST4, . . . may be supplied to the previous stage as a reset signal (e.g., a second carry signal). Each of the stages ST1, ST2, ST3, ST4, . . . may shift a potential of an output node from the high potential voltage to the first low potential voltage in response to the reset signal input from the subsequent stage.

Each of the stages ST1, ST2, ST3, ST4, . . . may output scan signals S[1], S[2], S[3], S[4], . . . in response to the scan start signal STV. For example, an (n)th stage may output an (n)th scan signal to an (n)th scan line. The scan start signal STV for controlling the timing of the first scan signal may be supplied to the first stage ST1.

Each of the stages ST1, ST2, ST3, ST4, . . . may include a first input terminal IN1, a second input terminal IN2, a third input terminal IN3, a scan clock input terminal CK, a first power input terminal V1, a second power input terminal V2, a carry output terminal CR, and an output terminal OUT.

Each of the stages ST1, ST2, ST3, ST4, . . . may be supplied with the first scan clock signal SCLK or the second scan clock signal SCLKB through the scan clock input terminal CK. For example, odd-numbered stages ST1, ST3, . . . may receive the first scan clock signal SCLK, and even-numbered stages ST2, ST4, . . . may receive the second scan clock signal SCLKB. The first scan clock signal SCLK may be set as the square wave signal that repeats a logic high level and a logic low level. The logic high level may correspond to the gate-on voltage, and the logic low level may correspond to the gate-off voltage. For example, the logic high level may be a voltage value between about 10V and about 30V, and the logic low level may be a voltage value between about −16V to about −3V.

The second scan clock signal SCLKB may be set to a square wave signal that repeats the logic high level and the logic low level. In an embodiment, the second scan clock signal SCLKB may have the same cycle as that of the first scan clock signal SCLK, and may be set to a signal a phase-inverted signal. However, this may be only exemplary, and a waveform relation between the first scan clock signal SCLK and the second scan clock signal SCLKB may not be limited thereto. For example, a portion of a logic high level period of the first scan clock signal SCLK and a portion of a logic high level period of the second scan clock signal SCLKB may instead overlap each other. The number of scan clock signals supplied to one stage may not be limited to the above example. For example, two or more clock signals may be applied to each of the stages ST1, ST2, ST3, ST4 . . . .

The first input terminal IN1 may receive the scan start signal STV or the carry signal of the previous stage. That is, the scan start signal STV may be supplied to the first input terminal IN1 of the first stage ST1, and the carry signal of the previous stage may be applied to the first input terminal IN1 in the stages other than the first stage ST1. The second input terminal IN2 may receive the carry signal of the subsequent stage. For example, the carry signal of the subsequent stage may be one of carry signals supplied after a time after the output of the carry signal of the current stage.

The third input terminal IN3 may receive the control voltage VON. In an embodiment, the control voltage VON may be a high potential voltage to be supplied to a source electrode of a transistor included in each of stages ST1, ST2, ST3, . . . . For example, the control voltage VON may be a constant voltage in the periphery of the logic high level (gate-on voltage) of the first scan clock signal SCLK. For example, the control voltage VON may have a voltage value between about 10V and about 30V.

In an embodiment, the control voltage VON may be equal to the scan clock signal SCLK or SCLKB. For example, each of the stages ST1, ST2, ST3, . . . may receive the same clock signal in the scan clock input terminal CK and the third input terminal IN3.

The carry output terminal CR may output a carry signal. The carry signal may be provided to the first input terminal IN1 of the subsequent stage. The output terminal OUT may output a scan signal. The scan signal may be supplied to a pixel through the scan line corresponding thereto.

The first power input terminal V1 may be supplied with the first power source VSS1, and the second power input terminal V2 may be supplied with the second power source VSS2. The first power source VSS1 and the second power source VSS2 may be set to gate-off voltages. In an embodiment, the first power source VSS1 and the second power source VSS2 may be equal to each other. Also, in an embodiment, a voltage level of the second power source VSS2 may be lower than that of the first power source VSS1. For example, the first power source VSS1 may be set within the range of about −14V to about −1V. and the second power source VSS2 may be set within the range of about −16V to about −3V.

Figure 5:
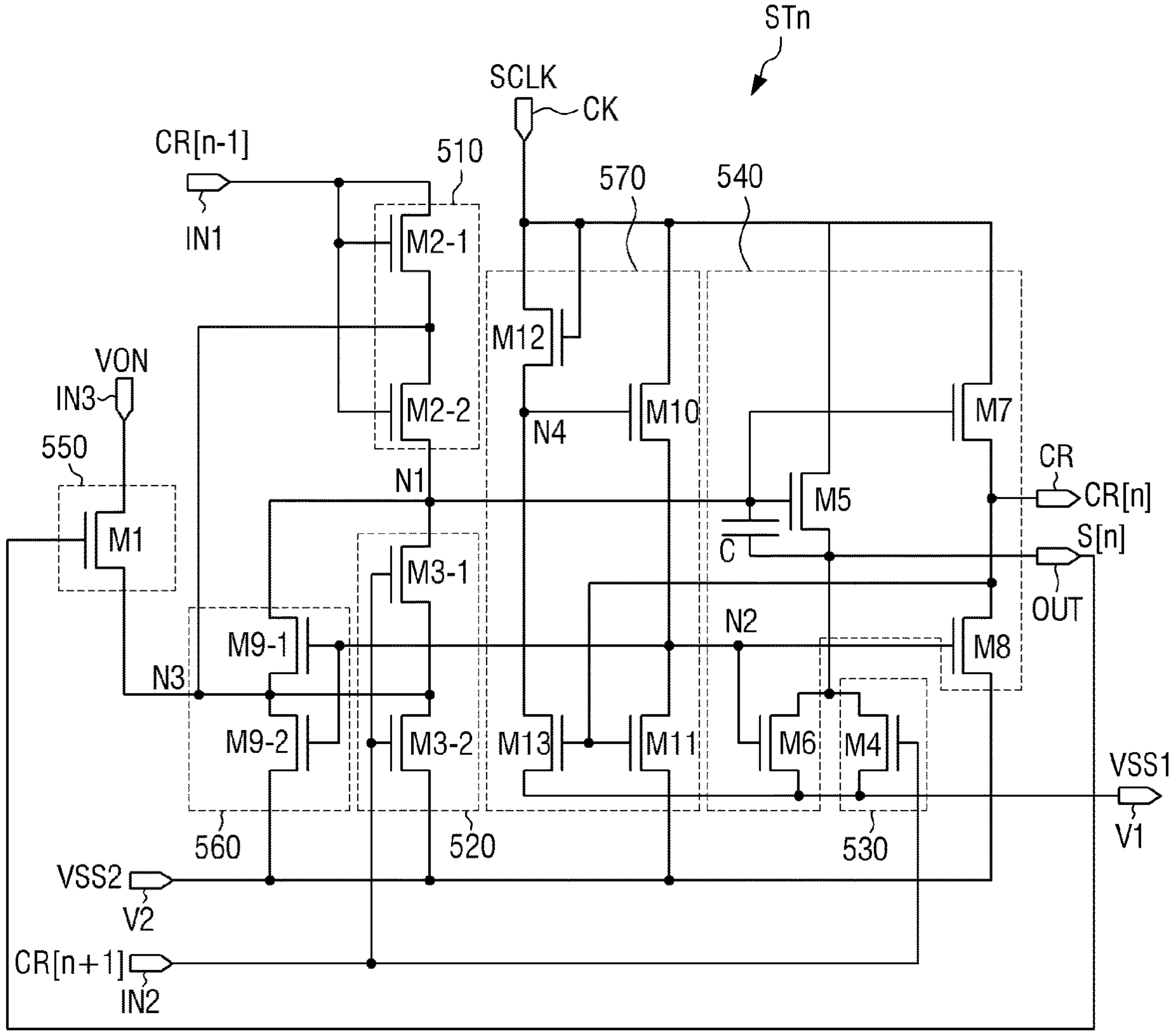
FIG. 5 is a schematic diagram of an equivalent circuit of a stage included in the scan signal driver of FIG. 4.

FIG. 5 is a schematic diagram of an equivalent circuit of a stage included in the scan signal driver of FIG. 4. In the following description, the transistors (i.e., TFTs) constituting the respective stages ST1, ST2, ST3, . . . have been described as being formed of N-type metal oxide semiconductor field effect transistors (MOSFET), but the disclosure may not be limited thereto. That is, the TFTs constituting the respective stages ST1, ST2, ST3 . . . may instead be formed of P-type MOSFETs. In one embodiment, the transistors included in the (n)th stage STn may be oxide semiconductor transistors. That is, a semiconductor layer (active pattern) of the transistors may be formed of an oxide semiconductor.

Referring to FIGS. 4 and 5, an (n)th stage STn (n may be a natural number) may include a first input part 510, a second input part 520, a first controller 530, an output part 540, and a leakage controller 550. In an embodiment, the (n)th stage may further include a second controller 560 and a third controller 570.

The first input part 510 may control a voltage of a first node N1 in response to a carry signal CR[n−1] (or a scan start signal (STV in FIG. 3)) of a previous stage, which may be supplied to the first input terminal IN1. The voltage of the first node N1 may be a voltage for controlling the outputs of the (n)th scan signal S[n] and the (n)th carry signal CR[n]. For example, the voltage of the first node N1 may be a voltage for controlling pull-up of the (n)th scan signal S[n] and the (n)th carry signal CR[n].

In an embodiment, the first input part 510 may include multiple second transistors M2-1 and M2-2 electrically connected in series between the first input terminal IN1 and the first node N1. Gate electrodes of the second transistors M2-1 and M2-2 may be commonly electrically connected to the first input terminal IN1. That is, the second transistors M2-1 and M2-2 may have a dual gate structure, and each of the second transistors M2-1 and M2-2 may have a diode connection structure. The first input part 510 may provide the gate-on voltage (e.g., a logic high level) of the (n−1)th carry signal CR[n−1] to the first node N1. For example, the first input part 510 may precharge the voltage of the first node N1 by using the gate-on voltage of the (n−1)th carry signal CR[n−1].

A common node (e.g., a source electrode of the transistor M2-1 and a drain electrode of the transistor M2-2) between the second transistors M2-1 and M2-2 may correspond to a third node N3. In other words, the common node between the second transistors M2-1 and M2-2 may be electrically connected to the third node N3.

When the voltage of the first node N1 may be a high voltage corresponding to a level of the gate-on voltage, and when the voltage of the common node between the second transistors M2-1, M2-2 may be lower than a reference, a leakage current may be generated from the first node N1 to the first input part 510. When a threshold voltage is negatively-shifted by degradation of the second transistors M2-1 and M2-2, a leakage current may be generated from the first node N1 to the first input part 510.

A threshold voltage Vth of the oxide semiconductor transistor may be shifted (negatively-shifted) to a negative value due to degradation or the like. A problem may occur in that a leakage current may be increased in a state that the oxide semiconductor transistor may be turned off, whereby a stage circuit operates abnormally.

In a state that the first node N1 may be charged with the gate-on voltage, a high voltage corresponding to a gate-on voltage level may be applied to the common node between the second transistors M2-1 and M2-2. The (n−1)th carry signal CR[n−1] may have the gate-off voltage, and the gate-off voltage may be supplied to the gate electrodes of the second transistors M2-1 and M2-2. Therefore, a gate-source voltage Vgs of the transistor M2-2 may be maintained at a very low value (e.g., negative value), and leakage current from the first node N1 to the first input part 510 may be avoided even though the second transistors M2-1 and M2-2 may be degraded.

The second input part 520 may control the voltage of the first node N1 in response to the reset signal (i.e., (n+1)th carry signal CR[n+1]) of the subsequent stage. In an embodiment, the second input part 520 may provide a voltage of the second power source VSS2 to the first node N1 in response to the (n+1)th carry signal CR[n+1]. For example, the second input part 520 may discharge the voltage of the first node N1 having a high potential voltage.

The second input part 520 may include multiple third transistors M3-1 and M3-2 electrically connected in series between the first node N1 and the second power input terminal V2. Gate electrodes of the third transistors M3-1 to M3-2 may be commonly electrically connected to the second input terminal IN2. A common node between the third transistors M3-1 and M3-2 may be electrically connected to the third node N3. In other words, the common node between the third transistors M3-1 and M3-2 may correspond to the third node N3.

The first controller 530 may control a voltage of the output terminal OUT for outputting the (n)th scan signal S[n] in response to the (n+1)th carry signal CR[n+1]. The voltage of the second node N2 may control a state of the gate-off voltage (logic low level) of the (n)th scan signal S[n] and the (n)th carry signal CR[n]. For example, the voltage of the second node N2 may be a voltage for controlling pull-down of the (n)th scan signal S[n] and the (n)th carry signal CR[n]. In an embodiment, the first controller 530 may provide the voltage of the first power source VSS1 to the output terminal OUT in response to the (n+1)th carry signal CR[n+1].

In an embodiment, the first controller 530 may include a fourth transistor M4 electrically connected between the output terminal OUT and the first power input terminal V1. A gate electrode of the fourth transistor M4 may be electrically connected to the second input terminal IN2. The fourth transistor M4 may discharge the voltage of the output terminal OUT with the voltage of the first power source VSS1.

The output part 540 may be electrically connected to the scan clock input terminal CK, the first power input terminal V1 and the second power input terminal V2. The output part 540 may output the (n)th scan signal S[n] and the (n)th carry signal CR[n], which corresponds to the scan clock signal SCLK, to the output terminal OUT and the carry output terminal CR, respectively, in response to the voltage of the first node N1 and the voltage of the second node N2. In an embodiment, the output part 540 may include fifth to eighth transistors M5 to M8 and a capacitor C.

The fifth transistor M5 may be electrically connected between the scan clock input terminal CK and the output terminal OUT. The fifth transistor M5 may include a gate electrode electrically connected to the first node N1. The fifth transistor M5 may supply the gate-on voltage to the output terminal OUT in response to the voltage of the first node N1. For example, the fifth transistor M5 may function as a pull-up buffer.

The sixth transistor M6 may be electrically connected between the output terminal OUT and the first power input terminal V1. The sixth transistor M6 may include a gate electrode electrically connected to the second node N2. The sixth transistor M6 may supply the gate-off voltage to the output terminal OUT in response to the voltage of the second node N2. For example, the sixth transistor M6 may hold the voltage of the output terminal OUT at a gate-off voltage level (or logic low level).

The seventh transistor M7 may be electrically connected between the scan clock input terminal CK and the carry output terminal CR. The seventh transistor M7 may include a gate electrode electrically connected to the first node N1. The seventh transistor M7 may supply the gate-on voltage to the carry output terminal CR in response to the voltage of the first node N1. For example, the seventh transistor M7 may function as a pull-up buffer.

The eighth transistor M8 may be electrically connected between the carry output terminal CR and the first power input terminal V1. The eighth transistor M8 may include a gate electrode electrically connected to the second node N2. The eighth transistor M8 may supply the gate-off voltage to the carry output terminal CR in response to the voltage of the second node N2. For example, the eighth transistor M8 may hold the voltage of the carry output terminal CR at the gate-off voltage level (i.e., logic low level).

The capacitor C may be electrically connected between the first node N1 and the output terminal OUT. The capacitor C may function as a boosting capacitor. That is, when the fifth transistor M5 may be turned on, the capacitor C may bootstrap the voltage of the first node N1 in response to an increase in the voltage of the output terminal OUT. Therefore, the fifth transistor M5 may stably hold a turned-on state for a period of time.

The second controller 560 may hold the voltage of the first node N1 at a gate-off voltage in response to the voltage of the second node N2. In an embodiment, the second controller 560 may provide the voltage (i.e., gate-off voltage) of the second power source VSS2 to the first node N1 in response to the voltage of the second node N2. In an embodiment, the second controller 560 may include ninth transistors M9-1 and M9-2 electrically connected in series between the first node N1 and the second power input terminal VSS2. Gate electrodes of the ninth transistors M9-1 and M9-2 may be commonly electrically connected to the second node N2. A common node between the ninth transistors M9-1 and M9-2 may be electrically connected to a third node N3. In other words, a common node between the ninth transistors M9-1 and M9-2 may correspond to the third node N3.

Two second transistors M2-1 and M2-2, two third transistors M3-1 and M3-2 and two ninth transistors M9-1 and M9-2 may be illustrated in FIG. 5, but the number of transistors electrically connected in series may not be limited thereto. For example, when three or more third transistors M3 may be electrically connected in series, at least one common node among the third transistors M3 may be electrically connected to the third node N3.

The third controller 570 may control the voltage of the second node N2 in response to the scan clock signal SCLK and the (n)th carry signal CR[n]. In an embodiment, the third controller 570 may supply the gate-off voltage to the second node N2 in response to the (n)th carry signal CR[n] while transferring the scan clock signal SCLK to the second node N2 in response to the scan clock signal SCLK. The voltage of the second node N2 may control the gate-off voltage (logic low level) state of the (n)th scan signal S[n] and the (n)th carry signal CR[n]. For example, the voltage of the second node N2 may be a voltage for controlling pull-down of the (n)th scan signal S[n] and the (n)th carry signal CR[n].

The third controller 570 may include tenth to thirteenth transistors M10 to M13. The tenth transistor M10 may be electrically connected between the scan clock input terminal CK and the second node N2. A gate electrode of the tenth transistor M10 may be electrically connected to a common node of the twelfth and thirteenth transistors M12 and M13 corresponding to the fourth node N4. The tenth transistor M10 may supply the scan clock signal SCLK to the second node N2 in response to the scan clock signal SCLK.

The eleventh transistor M11 may be electrically connected between the second node N2 and the second power input terminal V2. The twelfth and thirteenth transistors M12 and M13 may be electrically connected in series between the scan clock input terminal CK and the first power input terminal V1. A gate electrode of the twelfth transistor M12 may be electrically connected to the clock input terminal CK. Gate electrodes of the eleventh and thirteenth transistors M11 and M13 may be commonly electrically connected to the carry output terminal CR.

In case that the (n)th carry signal CR[n] is output (when the (n)th carry signal CR[n] has the gate-on voltage), the thirteenth transistor M13 may be turned on to turn off the tenth transistor M10, and the eleventh transistor M11 may be turned on to supply the voltage of the second power source VSS2 to the second node N2. Therefore, when the (n)th carry signal CR[n] may be output, the second node N2 may have the gate-off voltage.

The voltage level of the second power source VSS2 may be lower than that of the first power source VSS1. The voltage of the second power source VSS2 lower than that of the first power source VSS1 may be provided to the second node N2 by the operation of the eleventh transistor M11. This is to prevent an unintended operation of the sixth transistor M6 and/or the eighth transistor M8 due to the ripple of the voltage of the second node N2 when the voltage of the second node N2 may be changed from the gate-on voltage to the gate-off voltage. Therefore, one electrode of the eleventh transistor M11 may be electrically connected to the second power source VSS2 lower than the voltage of the first power source VSS1.

The leakage controller 550 may supply the control voltage VON, which may be supplied to the third input terminal IN3, to the first input part 510, the second input part 520 and the second controller 560 in response to one of the (n)th scan signal S[n] and the (n)th carry signal CR[n]. In an embodiment, the leakage controller 550 may include a first transistor M1 electrically connected between the third input terminal IN3 and the third node N3. The first transistor M1 may include a gate electrode that receives the (n)th scan signal S[n].

The first transistor M1 may supply the control voltage VON to the common nodes of the transistors electrically connected in series to the first node N1 in response to the (n)th scan signal S[n]. Therefore, while the first node N1 may be being charged (when the voltage of the first node N1 may be boosted), the control voltage VON of high potential may be applied to an electrode of the second transistor M2-2, an electrode of the third transistor M3-1 and an electrode of the ninth transistor M9-1. That is, while the first node N1 is being charged, the high potential voltage of the control voltage VON may be charged to the third node N3. Therefore, in case that the voltage of the first node N1 is boosted, a gate-source voltage Vgs of each of the second transistor M2-2, the third transistor M3-1, and the ninth transistor M9-1 may have a negative value, and the gate-source voltage Vgs of each of the second transistor M2-2, the third transistor M3-1 and the ninth transistor M9-1 may be held at a value much smaller than the threshold voltage. Therefore, leakage current from the first node N1 through the second transistor M2-2, the third transistor M3-1 and the ninth transistor M9-1 may be avoided.

As described above, each of the stages ST1, ST2, ST3, . . . included in the scan signal driver 200 includes multiple transistors and at least one capacitor to constitute a circuit for outputting a scan signal. According to an embodiment, the transistors included in each stage may be divided into a first group (or a plurality of first transistors) in which any one of multiple external signals may be input to a gate electrode thereof and a second group (or plurality of second transistors) in which a specific node within the stage connecting ones of the transistors of the stage may be electrically connected to a gate electrode thereof. The external signals may include at least one of a scan start signal STV, a carry signal input from a previous stage, a reset signal input from subsequent stage or a scan clock signal (e.g., first scan clock signal SCLK or second scan clock signal SCLKB), but the disclosure may not be limited thereto.

According to various embodiments of the disclosure, the circuit constituting each of the stages ST1, ST2, ST3, . . . included in the scan signal driver may not be limited to the example shown in FIG. 5, and various modifications may be made in the circuit. However, it may be general that the transistors in the circuit constituting each of the stages ST1, ST2, ST3, . . . included in the scan signal driver may be divided into a first group in which any one of the external signals may be input to a gate electrode thereof and a second group in which a specific node connecting some transistors among the transistors may be electrically connected to a gate electrode thereof. The following description will be based on the circuit of the stage shown in FIG. 5, but the disclosure may not be limited thereto.

Table 1 divides the transistors shown in FIG. 5 into a first group and a second group.

TABLE 1

| Group | Transistor |
|---|---|
| First group | Second transistors M2-1 and M2-2<br>Twelfth transistor M12<br>Third transistors M3-1 and M3-2<br>Fourth transistor M4 |
| Second group | First transistor M1<br>Fifth transistor M5<br>Sixth transistor M6<br>Seventh transistor M7<br>Eighth transistor M8<br>Ninth transistors M9-1 and M9-2<br>Tenth transistor M10<br>Eleventh transistor M11<br>Thirteenth transistor M13 |

As shown in Table 1, the transistors of the first group may include second transistors M2-1 and M2-2, a twelfth transistor M12, third transistors M3-1 and M3-2 and a fourth transistor M4. For example, the carry signal CR[n−1] or the scan start signal (STV in FIG. 3) of the previous stage may be input to the gate electrode of each of the second transistors M2-1 and M2-2 as any one of the external signals. Also, the first scan clock signal SCLK may be input to the gate electrode of the twelfth transistor M12 as any one of the external signals. The reset signal CR[n+1] of the subsequent stage may be input to the gate electrode of each of the third transistors M3-1 and M3-2 and the fourth transistor M4 as any one of the external signals.

As shown in Table 1, the transistors of the second group may include a first transistor M1, a fourth transistor M4, a fifth transistor M5, a sixth transistor M6, a seventh transistor M7, an eighth transistor M8, ninth transistors M9-1 and M9-2, a tenth transistor M10, an eleventh transistor M11 and a thirteenth transistor M13. For example, the first node N1 positioned between the second transistors M2-1 and M2-2 and the third transistors M3-1 and M3-2 may be electrically connected to the gate electrode of the fifth transistor M5. The fourth node N4 between the twelfth transistor M12 and the thirteenth transistor M13 may be electrically connected to a gate electrode of the tenth transistor M10. In this way, any one of the external signals may be electrically connected to drain electrodes or source electrodes of the transistors of the second group, or gate electrodes of the transistors of the second group may be electrically connected to a specific node connecting some transistors within a stage to each other.

In case that a pulse potential caused by Electro Static Discharge (ESD) is input to the scan signal driver 200 from the outside through an external input terminal (or pad portion), the transistors (e.g., the second transistors M2-1 and M2-2, the twelfth transistor M12, the third transistors M3-1 and M3-2 and the fourth transistor M4) of the first group among the stages ST1, ST2, ST3, . . . included in the scan signal driver 200 may be relatively vulnerable. For example, the transistors of the first group may be transistors in which any one of external signals may be input to a gate electrode thereof, and a characteristic change in which a threshold voltage Vth may be shifted by the inflow of static electricity may be generated to be relatively larger than that of the transistors of the second group.

In order to solve this problem, the scan signal driver 200 and the display device including the same according to the disclosure may reduce an error operation due to the inflow of static electricity by changing the structure of transistors of the first group, in which any one of external signals may be input to the gate electrode thereof. Hereinafter, the structure of the transistors of the first group, which reduces the error operation due to the inflow of static electricity, will be described in detail with reference to FIGS. 6 to 13.

The following description will be based on the twelfth transistor M12 on behalf of the transistors of the first group, and will be based on the tenth transistor M10 on behalf of the transistors of the second group. Therefore, features of the twelfth transistor M12, which will be described below, may be applied to the other transistors of the first group (e.g., the second transistors M2-1 and M2-2, the third transistors M3-1 and M3-2 and the fourth transistor M4) besides the twelfth transistor M12. Features of the tenth transistor M10, which will be described below, may be applied to the other transistors of the second group (e.g., the first transistor M1, the fourth transistor M4, the fifth transistor M5, the sixth transistor M6, the seventh transistor M7, the eighth transistor M8, the ninth transistors M9-1 and M9-2, the eleventh transistor M11 and the thirteenth transistor M13) besides the tenth transistor M10.

Figure 6:
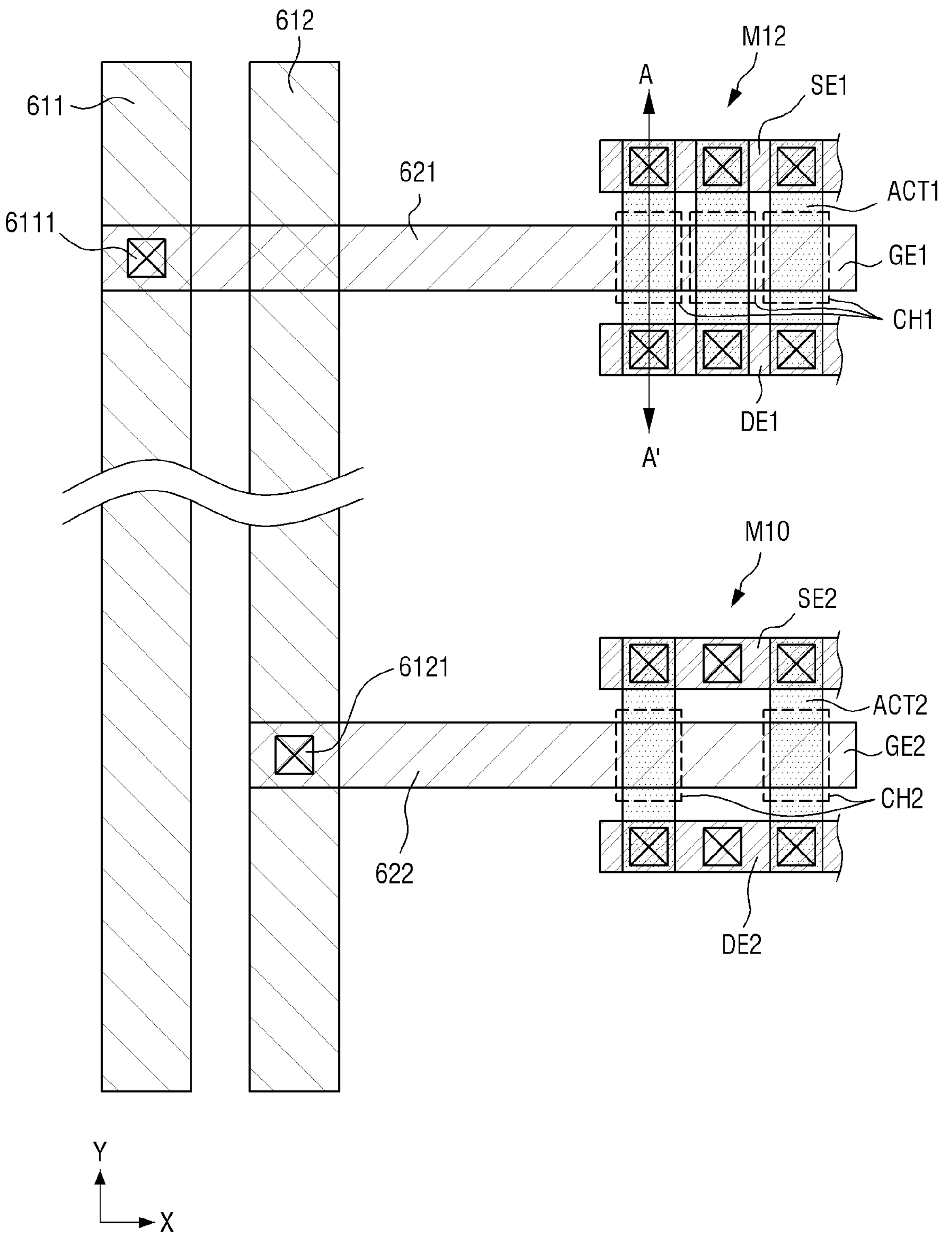
FIG. 6 is a plan view illustrating some transistors included in the stage of FIG. 5.
Figure 7:
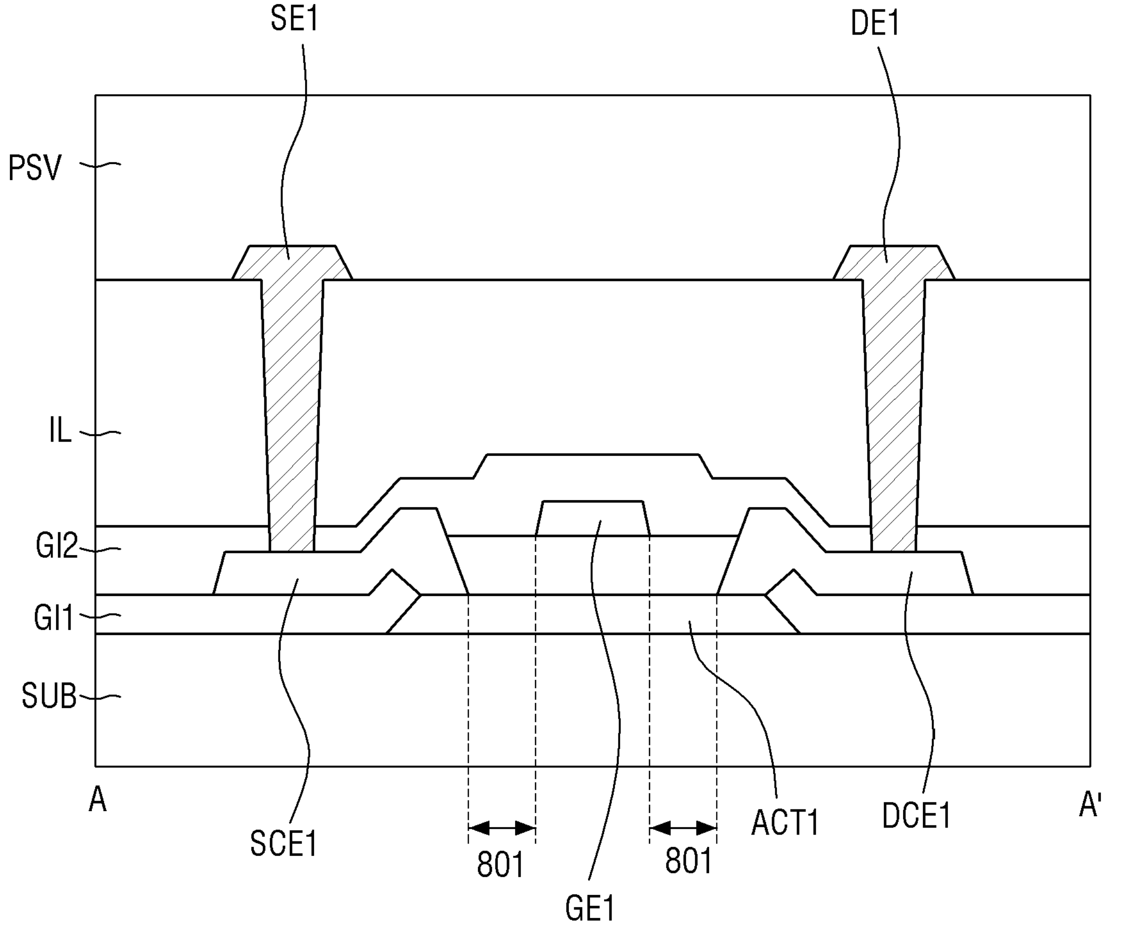
FIG. 7 is a schematic cross-sectional view illustrating a portion of each stage taken along line A-A' shown in FIG. 6.

FIG. 6 is a plan view illustrating some transistors included in the stage of FIG. 5, and FIG. 7 is a schematic cross-sectional view illustrating a portion of each stage taken along line A-A' shown in FIG. 6. Referring to FIG. 6, as an example of each transistor included in the first group, the twelfth transistor M12 includes a first gate electrode GE1 to which any one (e.g., first scan clock signal SCLK) of multiple external signals may be input, a first semiconductor layer ACT1 that overlaps at least a portion of the first gate electrode GE1 to form 'n' number of channel areas, and a first source electrode SE1 and a first drain electrode DE1, which may be spaced apart from each other by a distance with the first gate electrode GE1 interposed at the center therebetween.

In detail, the first gate electrode GE1 of the twelfth transistor M12 may be formed to be extended in the first direction (X-axis direction), and a supply line 611 of the first scan clock signal SCLK, which may be extended in the second direction (Y-axis direction) perpendicular to the first direction (X-axis direction), may be disposed in the periphery of the twelfth transistor M12. The first gate electrode GE1 of the twelfth transistor M12 may be electrically connected to the supply line 611 of the first scan clock signal (SCLK in FIGS. 4 and 5) through a first branch electrode 621 branched from the supply line 611 of the first scan clock signal SCLK. The first branch electrode 621 may be electrically connected to the supply line 611 of the first scan clock signal SCLK through a contact portion 6111 formed in a portion of the supply line 611 of the first scan clock signal SCLK, and may be formed to be extended in the first direction (X-axis direction).

The first gate electrode GE1 of the twelfth transistor M12 may be formed to be extended from an end of the first branch electrode 621. The first semiconductor layer ACT1 of the twelfth transistor M12 may include 'n' number of channel areas (e.g., first channel areas CH1) formed to be extended in the second direction (Y-axis direction) perpendicular to the first direction (X-axis direction) and spaced apart from each other in the first direction (X-axis direction). For example, as shown, the first semiconductor layer ACT1 of the twelfth transistor M12 may include three channel areas, but the disclosure may not be limited thereto.

As an example of each transistor included in the second group, the tenth transistor M10 includes a second gate electrode GE2 electrically connected to a line electrically connected to a node (i.e., the fourth node N4) between the twelfth transistor M12 and the thirteenth transistor M13, a second semiconductor layer ACT2 that overlaps at least a portion of the second gate electrode GE2 to form 'm' number of channel areas ('m' may be smaller than 'n'), and a second source electrode SE2 and a second drain electrode DE2, which may be spaced apart from each other by a distance with the second gate electrode GE2 interposed at the center therebetween.

In detail, the second gate electrode GE2 of the tenth transistor M10 may be formed to be extended in the first direction (X-axis direction), and a line 612 extended in the second direction (Y-axis direction) may be disposed in the periphery of the tenth transistor M10. The line 612 disposed in the periphery of the tenth transistor M10 may be the line 612 electrically connected to the fourth node N4 between the twelfth transistor M12 and the thirteenth transistor M13. The second gate electrode GE2 of the tenth transistor M10 may be electrically connected to the fourth node N4 between the twelfth transistor M12 and the thirteenth transistor M13 through a second branch electrode 622 branched from the line 612. The second branch electrode 622 may be electrically connected to the fourth node N4 between the twelfth transistor M12 and the thirteenth transistor M13 through a contact portion 6121 formed in a portion of the line 612, and may be formed to be extended in the first direction (X-axis direction).

The second gate electrode GE2 of the tenth transistor M10 may be formed to be extended from an end of the second branch electrode 622. The second semiconductor layer ACT2 of the tenth transistor M10 may include 'm' number of channel areas (e.g., second channel areas CH2) formed to be extended in the second direction (Y-axis direction) and spaced apart from each other in the first direction (X-axis direction). For example, as shown, the second semiconductor layer ACT2 of the tenth transistor M10 may include two channel areas, but the disclosure may not be limited thereto. The number of channel areas included in the second semiconductor layer ACT2 may be smaller than the number of channel areas included in the first semiconductor layer ACT1.

As described above, the scan signal driver 200 according to an embodiment may be designed such that the number of channel areas of each of the transistors of the first group among the transistors included in each stage may be more than the number of channel areas of each of the transistors of the second group, thereby providing a robust structure in which the electrical characteristics of the transistors of the first group may not be readily changed, even in case of the inflow of static electricity.

Referring to FIG. 7, the transistor included in the stage may be a thin film transistor having a top-gate structure. A substrate SUB may be a rigid substrate or a flexible substrate. The substrate SUB may be one of a glass substrate, a quartz substrate, a glass ceramic substrate, a film substrate including a polymer organic material, a plastic substrate, or a combination thereof.

In an embodiment, a buffer layer and/or a barrier layer may be disposed on the substrate SUB. The buffer layer and/or the barrier layer may include silicon oxide ($SiO_x$), silicon nitride ($SiN_x$), silicon oxynitride ($SiO_xN_y$), the like, or a combination thereof. The buffer layer and/or the barrier layer may have a single-layered structure or a multi-layered structure, which includes a silicon compound.

A semiconductor layer (e.g., a first semiconductor layer ACT1 and a second semiconductor layer ACT2) may be formed on the substrate SUB. The semiconductor layer may include a channel area and source and drain areas respectively formed at both sides of the channel area and doped with impurities. The semiconductor layer may include an oxide semiconductor. For example, the semiconductor layer may include an oxide semiconductor such as indium gallium zinc oxide (IGZO), zinc tin oxide (ZTO), indium tin zinc oxide (ITZO), or a combination thereof.

A first gate insulating layer GI1 may be formed on the substrate SUB on which the semiconductor layer may be formed. The first gate insulating layer GI1 may include at least one of an organic insulating layer or an inorganic insulating layer. Although not shown, a light shielding pattern (e.g., BML) may be formed between the substrate SUB and the semiconductor layer, but the disclosure may not be limited thereto, and the light shielding pattern may be omitted. For example, the light shielding pattern may be disposed below the semiconductor layer, and may include a material shielding light.

Gate electrode GE1 and GE2 may be formed on the first gate insulating layer GI1 to overlap channel areas (e.g., a first channel area CH1 and a second channel area CH2) of the semiconductor layer. In an embodiment, a source connection electrode (e.g., a first source connection electrode SCE1) electrically connected to a source area of the semiconductor layer through a contact hole and a drain connection electrode (e.g., a first drain connection electrode DCE1) electrically connected to a drain area of the semiconductor layer through a contact hole may be formed on the first gate insulating layer GI1.

A source electrode (e.g., the first source electrode SE1) may be electrically connected to the source connection electrode (e.g., the first source connection electrode SCE1) through a contact hole, but the source connection electrode (e.g., the first source connection electrode SCE1) may be omitted. For example, a source electrode (e.g., the first source electrode SE1) may instead be connected (e.g., directly connected) to a source area of a semiconductor layer through a contact hole. A drain electrode (e.g., the first drain electrode DE1) may be electrically connected to the drain connection electrode (e.g., the first drain connection electrode DCE1) through a contact hole, but the drain connection electrode (e.g., the first drain connection electrode DCE1) may be omitted. For example, the drain electrode (e.g., the first drain electrode DE1) may instead be connected (e.g., directly connected) to the drain area of the semiconductor layer through a contact hole.

In an embodiment, the gate electrodes GE1 and GE2, the source electrodes SE1 and SE2 and the drain electrodes DE1 and DE2 may be formed of the same material. For example, the gate electrodes GE1 and GE2, the source electrodes SE1 and SE2 and the drain electrodes DE1 and DE2 may include metal, an alloy, a metal nitride, a conductive metal oxide, a transparent conductive material, the like, or a combination thereof.

The second gate insulating layer GI2, which covers the gate electrodes GE1 and GE2, the source connection electrode SCE1 (or the source electrode) and the drain connection electrode DCE1 (or the drain electrode) may be formed on the first gate insulating layer GI1. The second gate insulating layer GI2 may include at least one of an organic insulating layer or an inorganic insulating layer.

An interlayer insulating layer IL may be formed on the second gate insulating layer GI2. The interlayer insulating layer IL may include at least one of an organic insulating layer or an inorganic insulating layer. The source electrodes SE1 and SE2 and the drain electrodes DE1 and DE2 may be formed on the interlayer insulating layer IL by passing through the interlayer insulating layer IL and the second gate insulating layer GI2. A passivation layer PSV, which covers the source electrodes SE1 and SE2 and the drain electrodes DE1 and DE2, may be formed on the interlayer insulating layer IL. The passivation layer PSV may include at least one of an organic insulating layer or an inorganic insulating layer.

As described above, the transistor included in the display device and the scan driver according to the embodiments of the disclosure may be implemented as an oxide semiconductor transistor having a top-gate structure. However, the top-gate structure may be only exemplary, and the structure of the transistor may not be limited thereto. For example, the transistor may instead have a bottom-gate structure.

A reference numeral 801, which may not be described in FIG. 7, may denote a length of an ohmic bridge area positioned between the first channel area CH1 and the source area of the first semiconductor layer ACT1 in each of the transistors of the first group or a length of an ohmic bridge area positioned between the first channel area CH1 and the drain area of the first semiconductor layer ACT1. For example, an ohmic contact layer (not shown) may be formed between the semiconductor layer and each of the source connection electrode SCE1 (or the source electrode) and the drain connection electrode DCE1 (or the drain electrode). The ohmic bridge area may be an area in which a portion of the ohmic contact layer may be formed between the channel area and each of the source area and the drain area.

Figure 8:
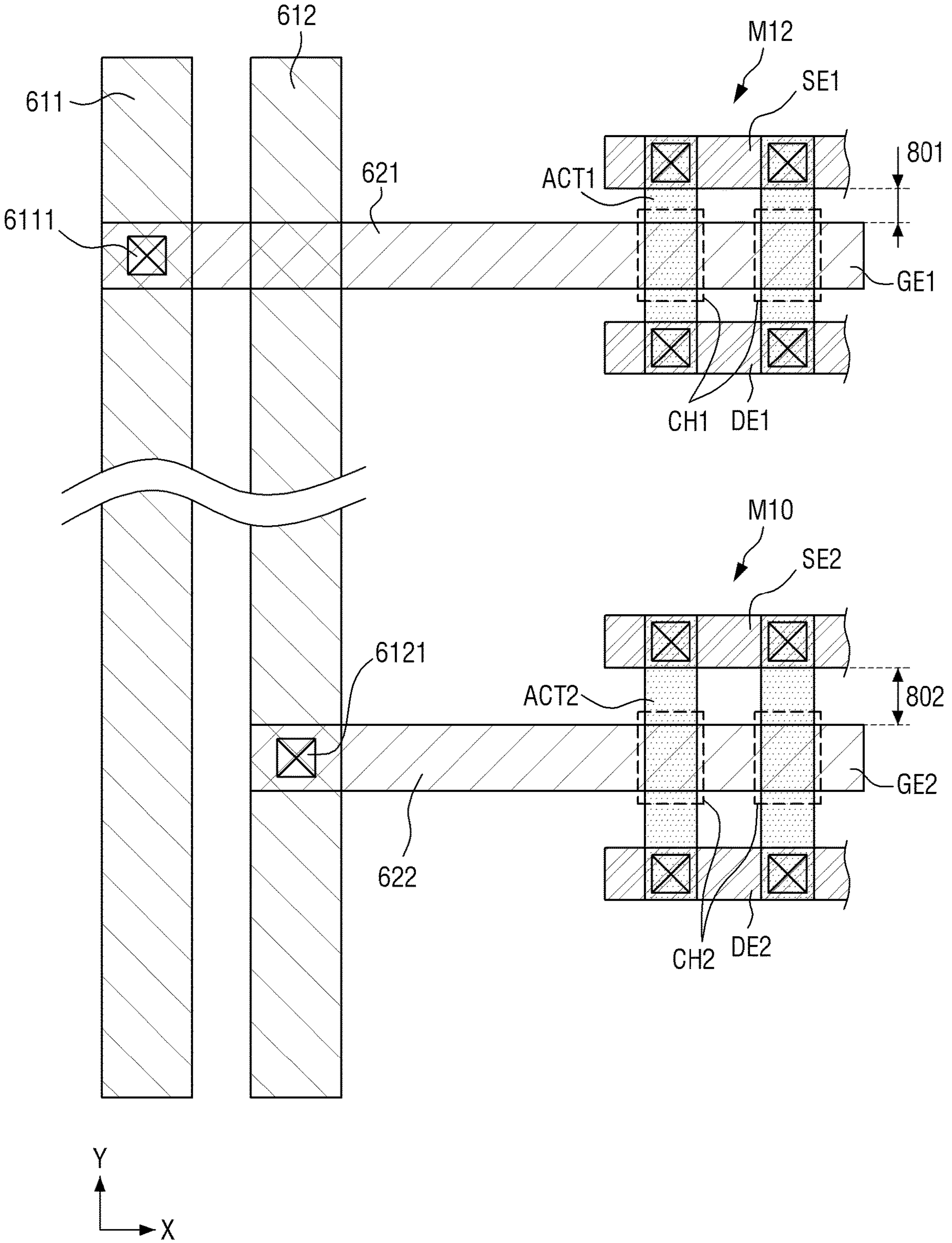
FIG. 8 is a plan view illustrating some transistors included in the stage of FIG. 5 according to an embodiment.

FIG. 8 is a plan view illustrating some transistors included in the stage of FIG. 5 according to an embodiment. The twelfth transistor M12 and the tenth transistor M10, which may be shown in FIG. 8, may be at least partially similar to the twelfth transistor M12 and the tenth transistor M10, which may be described with reference to FIGS. 6 and 7. Hereinafter, only elements changed from the twelfth transistor M12 and the tenth transistor M10, which may be described with reference to FIGS. 6 and 7, will be described with reference to FIG. 8. Therefore, elements which may not be described with reference to FIG. 8 will be replaced with the features of the twelfth transistor M12 and the tenth transistor M10, which have previously been described with reference to FIGS. 6 and 7.

Referring to FIG. 8, as an example of each transistor included in the first group, the twelfth transistor M12 may include an ohmic bridge area having a first length 801. For example, the twelfth transistor M12 may include a first semiconductor layer ACT1, and the first semiconductor layer ACT1 may include a first source area that may be in contact with the first source electrode SE1 and may be doped with impurities, and a first drain area that may be in contact with the first drain electrode DE1 and may be doped with impurities. The first channel area CH1 may be formed between the first source area and the first drain area. The twelfth transistor M12 may include an ohmic contact layer (not shown) formed between each of the first source electrode SE1 and the first drain electrode DE1 and the first semiconductor layer ACT1. At this time, the ohmic bridge area, which corresponds to a space between the first channel area CH1 and each of the first source area and the first drain area and may be a portion of the ohmic contact layer, may have a first length 801.

As an example of each transistor included in the second group, the tenth transistor M10 may include an ohmic bridge area having a second length longer than the first length. For example, the tenth transistor M10 may include a second semiconductor layer ACT2, and the second semiconductor layer ACT2 may include a second source area that may be in contact with the second source electrode SE2 and may be doped with impurities, and a second drain area that may be in contact with the second drain electrode DE2 and may be doped with impurities. The second channel area CH2 may be formed between the second source area and the second drain area. The tenth transistor M10 may include an ohmic contact layer formed between each of the second source electrode SE2 and the second drain electrode DE2 and the second semiconductor layer ACT2. At this time, the ohmic bridge area, which corresponds to a space between the second channel area CH2 and each of the second source area and the second drain area and may be a portion of the ohmic contact layer, may have a second length 802 longer than the first length 801.

As described above, the scan signal driver 200 according to an embodiment may be designed such that the ohmic bridge area of each of the transistors of the first group among the transistors included in each stage has a first length 801 that may be relatively short and the ohmic bridge area of each of the transistors of the second group has a second length 802 that may be relatively long, thereby providing a robust structure in which the electrical characteristics of the transistors of the first group may not be readily changed in case of the inflow of static electricity.

Figure 9:
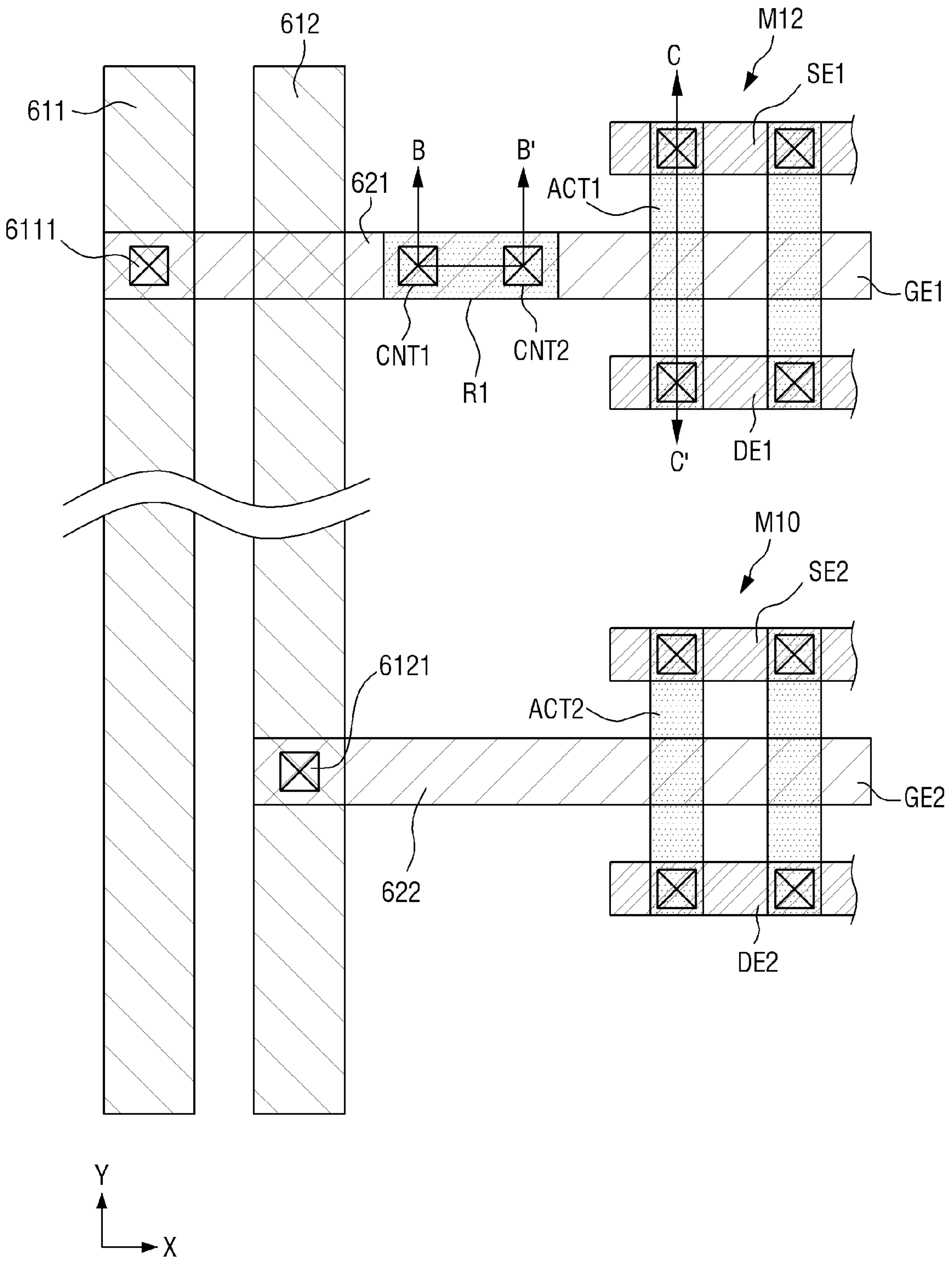
FIG. 9 is a view illustrating an embodiment in which resistive element may be added to some transistors included in the stage of FIG. 5.
Figure 10:
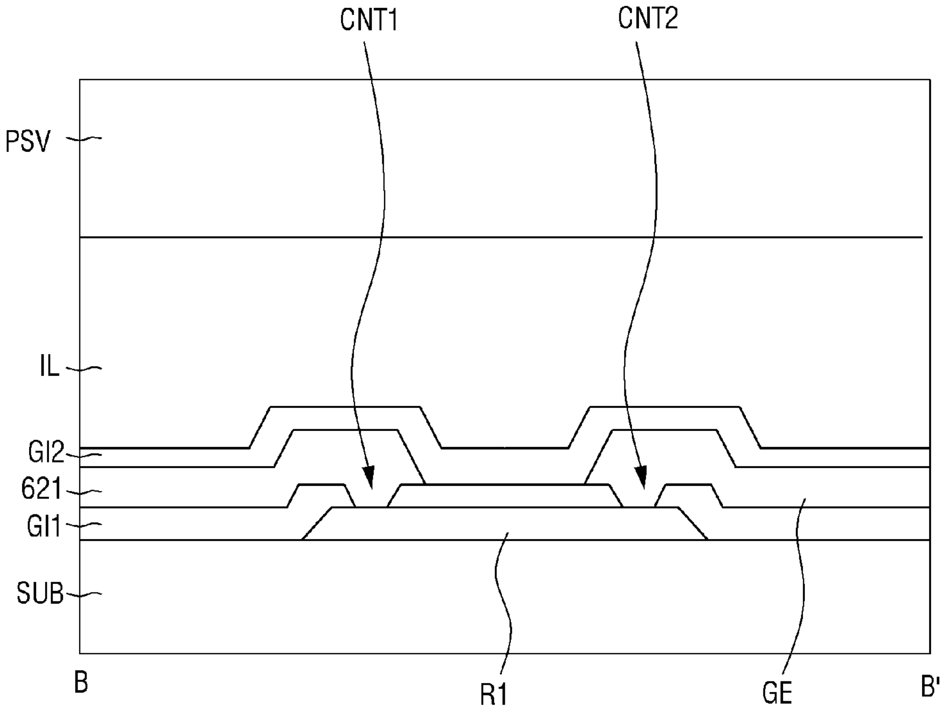
FIG. 10 is a schematic cross-sectional view illustrating a portion of each stage taken along lines B-B' and C-C' shown in FIG. 9.
Figure 10:
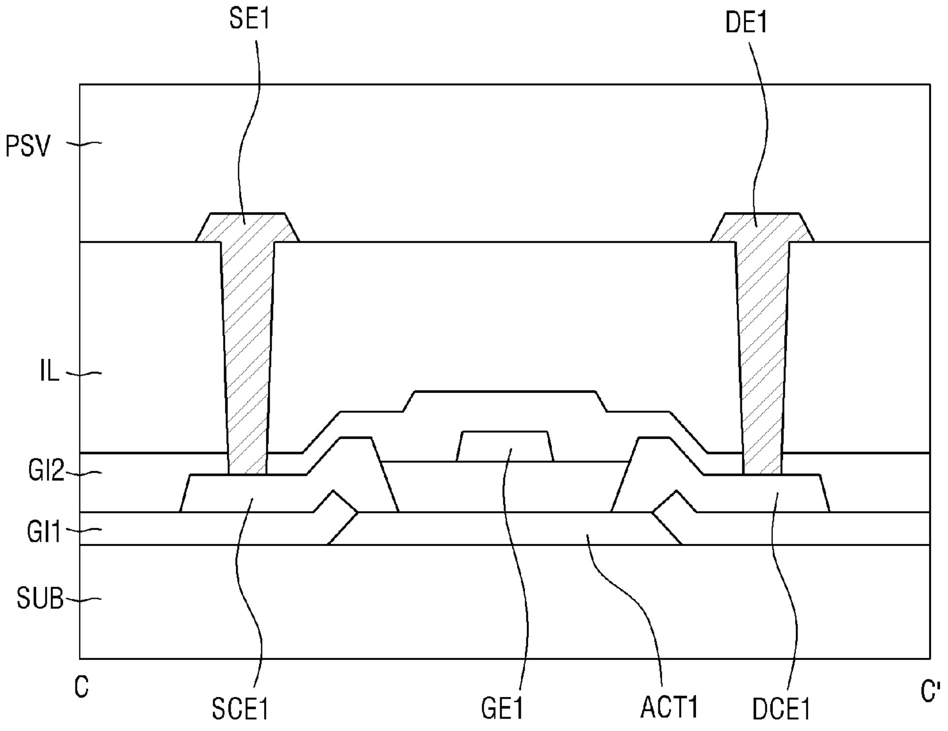

FIG. 9 is a view illustrating an embodiment in which a resistive element may be added to some transistors included in the stage of FIG. 5, and FIG. 10 is a schematic cross-sectional view illustrating a portion of each stage taken along lines B-B' and C-C' shown in FIG. 9. The twelfth transistor M12 and the tenth transistor M10, which are shown in FIGS. 9 and 10, may be at least partially similar to the twelfth transistor M12 and the tenth transistor M10 previously described with reference to FIGS. 6 and 7. Hereinafter, only elements changed from the twelfth transistor M12 and the tenth transistor M10 previously described with reference to FIGS. 6 and 7 will be described with reference to FIGS. 9 and 10. Therefore, elements which may not be described with reference to FIGS. 9 and 10, will be replaced with the features of the twelfth transistor M12 and the tenth transistor M10 previously described with reference to FIGS. 6 and 7.

Referring to FIGS. 9 and 10, as an example of each transistor included in the first group, the twelfth transistor M12 may include a resistive element R1 disposed between the supply line 611 of the external signal and the first gate electrode GE1. For example, the line 611, to which the first scan clock signal SCLK that may be one of the external signals is supplied, may be formed in the periphery of the twelfth transistor M12, and the resistive element R1 connecting the line 611 with the first gate electrode GE1 of the twelfth transistor M12 may be disposed between the line 611 and the first gate electrode GE1 of the twelfth transistor M12.

The resistive element R1 may include an impurity semiconductor formed on a same layer as the first semiconductor layer ACT1 and doped with impurities. The resistive element R1 and the first semiconductor layer ACT1 may be formed by the same process. The resistive element R1 may be electrically connected to the supply line 611 of the external signal, for example, the supply line 611 of the first scan clock signal SCLK through a first contact hole CNT1, and may be electrically connected to the first gate electrode GE1 of the twelfth transistor M12 through a second contact hole CNT2.

As an example of each transistor included in the second group, the resistive element R1 may not be disposed at the periphery of the tenth transistor M10. For example, the second gate electrode GE2 of the tenth transistor M10 may be electrically connected to the line 612 electrically connected to the fourth node N4 between the twelfth transistor M12 and the thirteenth transistor M13, and the resistive element R1 may not be disposed between the line 612 and the second gate electrode GE2.

As described above, in the scan signal driver 200 according to an embodiment, the resistive element R1 may be disposed to be adjacent to each of the transistors of the first group among the transistors included in each stage, and the resistive element R1 may be electrically connected to the first gate electrode GE1 of each of the transistors of the first group. The scan signal driver according to an embodiment may provide a robust structure in which the electrical characteristics of the transistors of the first group may not be readily changed even in case of the inflow of static electricity.

Figure 11:
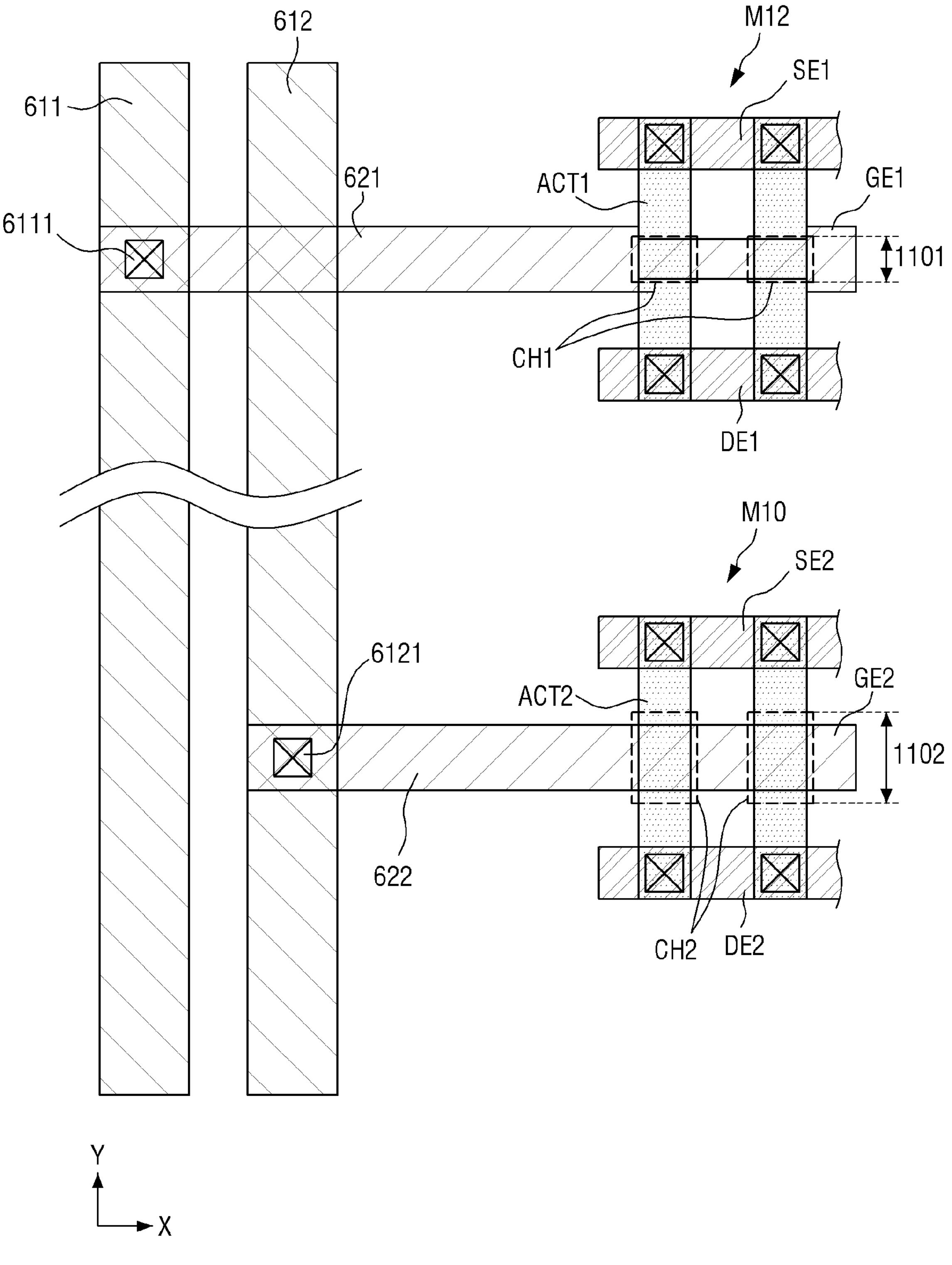
FIG. 11 is a view illustrating an embodiment in which a channel length of some transistors included in the stage of FIG. 5 may be adjusted.

FIG. 11 is a view illustrating an embodiment in which a channel length or length of a channel area of some transistors included in the stage of FIG. 5 may be adjusted. The twelfth transistor M12 and the tenth transistor M10, which may be shown in FIG. 11, may be at least partially similar to the twelfth transistor M12 and the tenth transistor M10, which may be described with reference to FIGS. 6 and 7. Hereinafter, only elements changed from the twelfth transistor M12 and the tenth transistor M10 previously described with reference to FIGS. 6 and 7 will be described with reference to FIG. 11. Therefore, elements which may not be described with reference to FIG. 11 will be replaced with the features of the twelfth transistor M12 and the tenth transistor M10 as previously described with reference to FIGS. 6 and 7.

Referring to FIG. 11, as an example of each transistor included in the first group, the twelfth transistor M12 may be designed to have a channel length that may be relatively short. For example, the twelfth transistor M12 may be designed such that as a width of the first gate electrode GE1 becomes narrow in the first channel area CH1, whereby the channel length 1101 of the twelfth transistor M12 may be shortened. As an example of each transistor included in the second group, the tenth transistor M10 may have a channel length 1102 longer than that of the twelfth transistor M12. For example, a length of the first channel area CH1 formed in the twelfth transistor M12 may be shorter than that of the second channel area CH2 formed in the tenth transistor M10. To this end, a width of the second gate electrode GE2 in the second channel area CH2 of the tenth transistor M10 may not be narrowed, unlike the twelfth transistor M12.

As described above, the scan signal driver 200 according to an embodiment may be designed such that each of the transistors of the first group among the transistors included in each stage has a channel length that may be relatively short, thereby providing a robust structure in which the electrical characteristics of the transistors of the first group may not be readily changed even in case of the inflow of static electricity.

Figure 12:
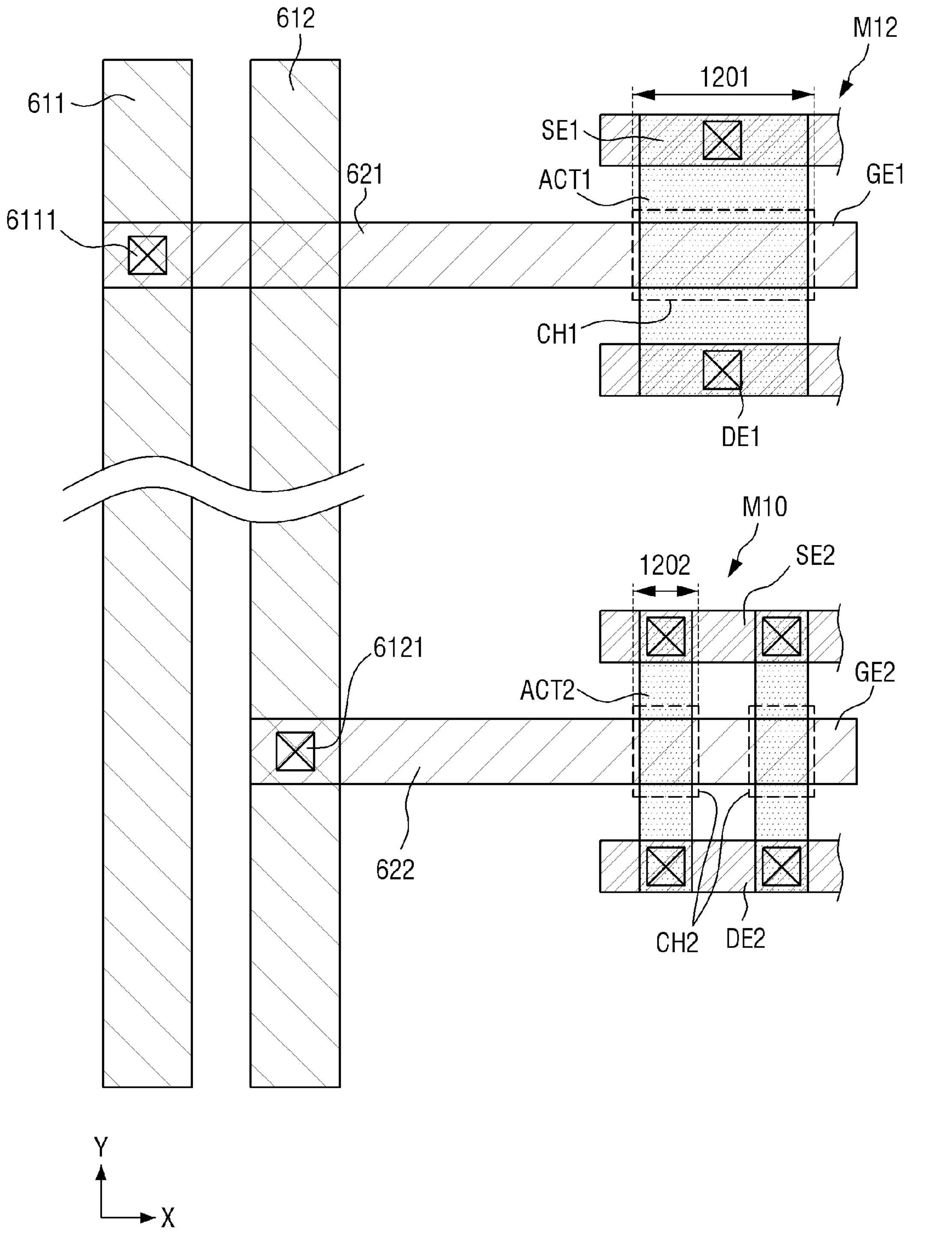
FIG. 12 is a view illustrating an embodiment in which a channel width of some transistors included in the stage of FIG. 5 may be adjusted.

FIG. 12 is a view illustrating an embodiment in which a channel width or width of a channel area of some transistors included in the stage of FIG. 5 may be adjusted. The twelfth transistor M12 and the tenth transistor M10, which may be shown in FIG. 12, may be at least partially similar to the twelfth transistor M12 and the tenth transistor M10 previously described with reference to FIGS. 6 and 7. Hereinafter, only elements changed from the twelfth transistor M12 and the tenth transistor M10 previously described with reference to FIGS. 6 and 7 will be described with reference to FIG. 12. Therefore, elements, which may not be described with reference to FIG. 12 will be replaced with the features of the twelfth transistor M12 and the tenth transistor M10 as previously described with reference to FIGS. 6 and 7.

Referring to FIG. 12, as an example of each transistor included in the first group, the twelfth transistor M12 may be designed to have a channel width that may be relatively large. For example, as the twelfth transistor M12 includes a first semiconductor layer ACT1 having a first width 1201, its channel area width may be relatively increased.

As an example of each transistor included in the second group, the tenth transistor M10 may have a channel width smaller than that of the twelfth transistor M12. For example, the tenth transistor M10 includes multiple second semiconductor layers ACT2 having a second width 1202 smaller than the first width 1201 and spaced apart from each other in the first direction (X-axis direction) at a specified interval, so that the channel width of the tenth transistor M10 may be smaller than that of the twelfth transistor M12.

As described above, the scan signal driver 200 according to an embodiment may be designed such that each of the transistors of the first group among the transistors included in each stage has a channel width that may be relatively large, thereby providing a robust structure in which the electrical characteristics of the transistors of the first group may not be readily changed even in case of the inflow of static electricity.

Figure 13:
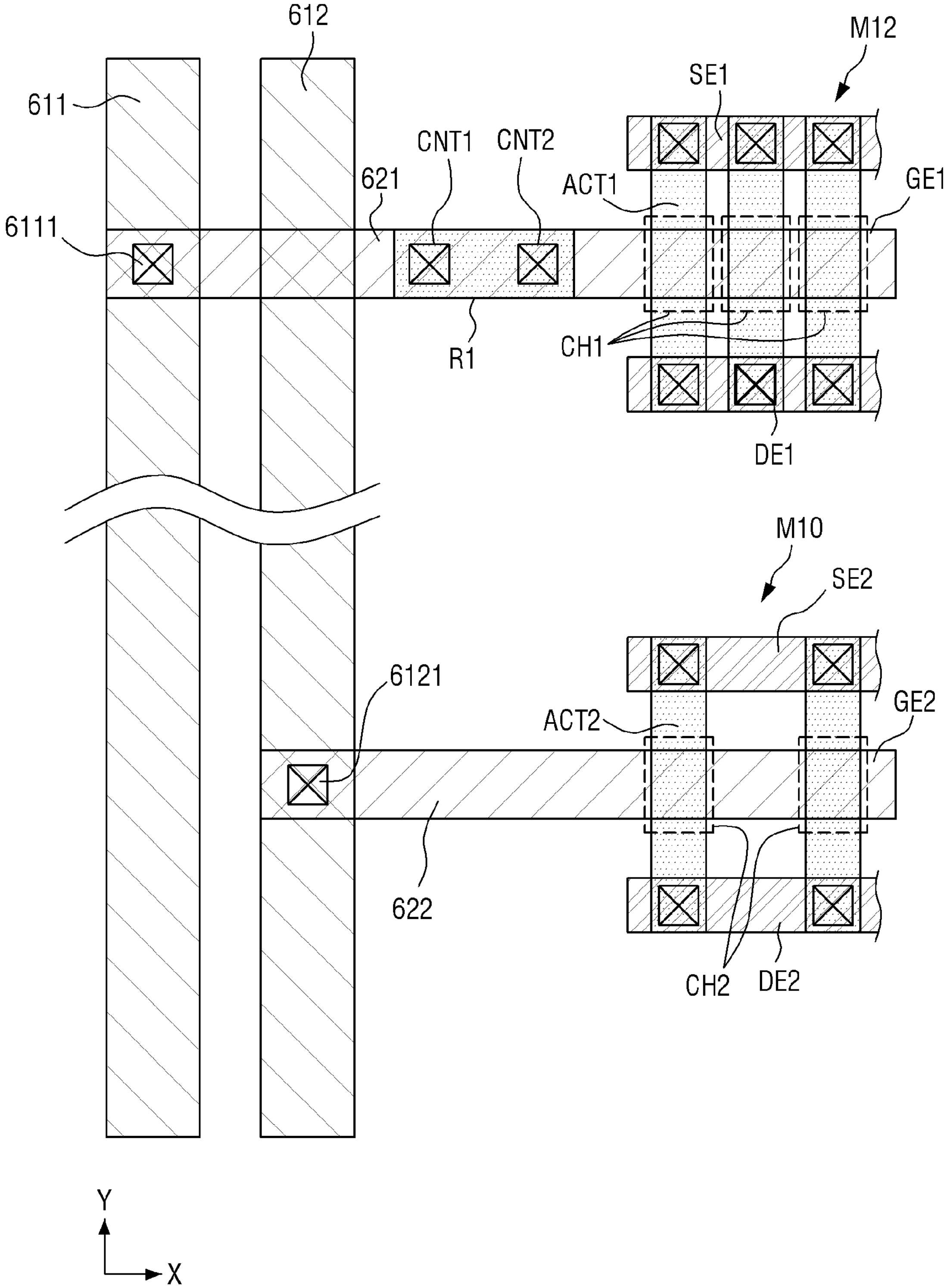
FIG. 13 is a view illustrating an embodiment in which the number of channel areas of some transistors included in the stage of FIG. 5 may be adjusted and a resistive element may be added.

According to various embodiments, the embodiments described with reference to FIGS. 6 to 12 may be implemented in combination. For example, FIG. 13 illustrates an example in which an embodiment described with reference to FIG. 6 may be combined with an embodiment described with reference to FIG. 9. Although the embodiment describes only FIG. 13 as an example of combination between embodiments, the disclosure may not be limited thereto, and various modifications may be made in combination of the embodiments described with reference to FIGS. 6 to 12.

FIG. 13 is a view illustrating an embodiment in which the number of channel areas of some transistors included in the stage of FIG. 5 may be adjusted and resistive may be added. The twelfth transistor M12 and the tenth transistor M10, which are shown in FIG. 13, may be at least partially similar to the twelfth transistor M12 and the tenth transistor M10, which may be described with reference to FIGS. 6 and 7. Hereinafter, only elements changed from the twelfth transistor M12 and the tenth transistor M10, which are described with reference to FIGS. 6 and 7, will be described with reference to FIG. 13. Therefore, elements which may not be described with reference to FIG. 13 will be replaced with the features of the twelfth transistor M12 and the tenth transistor M10 as previously described with reference to FIGS. 6 and 7.

Referring to FIG. 13, as an example of each transistor included in the first group, the first gate electrode GE1 of the twelfth transistor M12 may be formed to be extended from an end of the first branch electrode 621. The first semiconductor layer ACT1 of the twelfth transistor M12 may include 'n' number of channel areas (e.g., first channel areas CH1) formed to be extended in the second direction (Y-axis direction) perpendicular to the first direction (X-axis direction) and spaced apart from each other in the first direction (X-axis direction). For example, as shown, the first semiconductor layer ACT1 of the twelfth transistor M12 may include three channel areas, but the disclosure may not be limited thereto.

The resistive element R1 may be disposed between the supply line 611 of the external signal and the first gate electrode GE1 of the twelfth transistor M12. For example, the line 611, to which the first scan clock signal SCLK that may be one of the external signals may be supplied, may be formed in the periphery of the twelfth transistor M12, and the resistive element R1 connecting the line 611 with the first gate electrode GE1 of the twelfth transistor M12 may be disposed between the line 611 and the first gate electrode GE of the twelfth transistor M12.

As an example of each transistor included in the second group, the second gate electrode GE2 of the tenth transistor M10 may be formed to be extended from an end of the second branch electrode 622. The second semiconductor layer ACT2 of the tenth transistor M10 may include 'm' number of channel areas (e.g., second channel areas CH2) formed to be extended in the second direction (Y-axis direction) and spaced apart from each other in the first direction (X-axis direction). For example, as shown, the second semiconductor layer ACT2 of the tenth transistor M10 may include two channel areas, but the disclosure may not be limited thereto. The number of channel areas included in the second semiconductor layer ACT2 may be smaller than the number of channel areas included in the first semiconductor layer ACT1.

The resistive element R1 may not be disposed in the periphery of the tenth transistor M10. For example, the second gate electrode GE2 of the tenth transistor M10 may be electrically connected to the line 612 that is electrically connected to the node between the twelfth transistor M12 and the thirteenth transistor M13, and the resistive element R1 may not be disposed between the line 612 and the second gate electrode GE2.

In concluding the detailed description, those skilled in the art will appreciate that many variations and modifications can be made to the embodiments without substantially departing from the principles of the disclosure. Therefore, the disclosed embodiments of the disclosure may be used in a generic and descriptive sense only and not for purposes of limitation.

What is claimed is:

1. A scan signal driver comprising:

a plurality of stages that sequentially outputs a plurality of scan signals based on a plurality of driving voltages and a plurality of external signals received by the plurality of stages, wherein each of the plurality of stages includes a plurality of transistors and at least one specific node electrically connected to ones of the plurality of transistors, the plurality of transistors including a plurality of first transistors and a plurality of second transistors, each of the plurality of first transistors includes:

a first gate electrode that receives any one of the plurality of external signals;

a first semiconductor layer overlapping at least a portion of the first gate electrode, the first semiconductor layer including 'n' number of channel areas; and a first source electrode and a first drain electrode spaced apart from each other by a distance, the first gate electrode disposed at a center between the first source electrode and the first drain electrode, and each of the plurality of second transistors includes:

a second gate electrode electrically connected to any one of the at least one specific node;

a second semiconductor layer overlapping at least a portion of the second gate electrode, the second semiconductor layer including 'm' number of channel areas smaller than the 'n' number of channel areas; and a second source electrode and a second drain electrode spaced apart from each other by a distance, the second gate electrode being disposed at a center between the second source electrode and the second drain electrode.

2. The scan signal driver of claim 1, wherein the plurality of external signals include at least one of a scan start signal, a carry signal input from a previous stage, a reset signal input from a subsequent stage, and a scan clock signal.

3. The scan signal driver of claim 1, wherein the plurality of driving voltages include at least one of a high potential voltage, a first low potential voltage, and a second low potential voltage, and the second low potential voltage has a potential lower than that of the first low potential voltage.

4. The scan signal driver of claim 1, wherein in each of the plurality of first transistors:

the first gate electrode extends in a first direction, and the 'n' number of channel areas of the first semiconductor layer extends in a second direction intersecting the first direction, wherein ones of the 'n' number of channel areas are spaced apart from each other in the first direction, and in each of the plurality of second transistors:

the second gate electrode extends in the first direction, and the 'm' number of channel areas of the second semiconductor layer extends in the second direction, wherein ones of the 'm' number of channel areas are spaced apart from each other in the first direction.

5. The scan signal driver of claim 1, wherein the first semiconductor layer of each of the plurality of first transistors includes:

a first source area electrically connected to the first source electrode, the first source area being doped with impurities;

a first drain area electrically connected to the first drain electrode, the first drain area being doped with impurities;

a first channel area disposed between the first source area and the first drain area, the first channel area overlapping the first gate electrode; and an ohmic bridge area disposed between the first channel area and each of the first source area and the first drain area, the ohmic bridge area has a first length, and the second semiconductor layer in each of the plurality of second transistors includes:

a second source area electrically connected to the second source electrode, the second source area being doped with impurities;

a second drain area electrically connected to the second drain electrode, the second drain area being doped with impurities;

a second channel area disposed between the second source area and the second drain area, the second channel area overlapping the second gate electrode; and an ohmic bridge area disposed between the second channel area and each of the second source area and the second drain area, the ohmic bridge area has a second length longer than the first length.

6. The scan signal driver of claim 1, further comprising:

a resistive element disposed between the first gate electrode of each of the first transistors and a supply line that supplies any one of the plurality of external signals, wherein the resistive element is absent between any of the at least one specific node and the second gate electrode of any of the plurality of second transistors.

7. The scan signal driver of claim 6, wherein in each of the plurality of first transistors, the resistive element includes an impurity semiconductor, the impurity semiconductor and the first semiconductor layer being disposed on a same layer, the impurity semiconductor being doped with impurities.

8. The scan signal driver of claim 7, wherein in each of the plurality of first transistors, the resistive element is electrically connected to the supply line through a first contact hole, and the resistive element is electrically connected to the first gate electrode through a second contact hole.

9. The scan signal driver of claim 1, wherein a channel length of the first semiconductor layer of each of the plurality of first transistors is shorter than a channel length of the second semiconductor layer of each of the plurality of second transistors.

10. The scan signal driver of claim 1, wherein a channel width of the first semiconductor layer of each of the plurality of first transistors is greater than a channel width of the second semiconductor layer of each of the plurality of second transistors.

11. A display device comprising:

a display panel including a plurality of scan signal lines and a plurality of data lines; and a scan signal driver that drives the plurality of scan signal lines, wherein the scan signal driver includes a plurality of stages that sequentially outputs a plurality of scan signals based on a plurality of driving voltages and a plurality of external signals received by the plurality of stages, each of the plurality of stages includes a plurality of transistors and at least one specific node electrically connected to ones of the plurality of transistors, the plurality of transistors including a plurality of first transistors and a plurality of second transistors, each of the plurality of first transistors includes:

a first gate electrode that receives any one of the plurality of external signals;

a first semiconductor layer overlapping at least a portion of the first gate electrode, the first semiconductor layer including 'n' number of channel areas; and a first source electrode and a first drain electrode spaced apart from each other by a distance, the first gate electrode disposed at a center between the first source electrode and the first drain electrode, and each of the plurality of second transistors includes:

a second gate electrode electrically connected to any one of the at least one specific node;

a second semiconductor layer overlapping at least a portion of the second gate electrode, the second semiconductor layer including 'm' number of channel areas smaller than the 'n' number of channel areas; and a second source electrode and a second drain electrode spaced apart from each other by a distance, the second gate electrode being disposed at a center between the second source electrode and the second drain electrode.

12. The display device of claim 11, wherein the plurality of external signals include at least one of a scan start signal, a carry signal input from a previous stage, a reset signal input from a subsequent stage, and a scan clock signal.

13. The display device of claim 11, wherein the plurality of driving voltages include at least one of a high potential voltage, a first low potential voltage, and a second low potential voltage, and the second low potential voltage has a potential lower than that of the first low potential voltage.

14. The display device of claim 11, wherein
in each of the plurality of first transistors:
the first gate electrode extends in a first direction, and
the 'n' number of channel areas of the first semiconductor layer extends in a second direction intersecting the first direction and are spaced apart from each other in the first direction, and
in each of the plurality of second transistors:
the second gate electrode extends in the first direction, and
the 'm' number of channel areas of the second semiconductor layer extends in the second direction and are spaced apart from each other in the first direction.

15. The display device of claim 11, wherein the first semiconductor layer of each of the plurality of first transistors includes:
a first source area electrically connected to the first source electrode, the first source area being doped with impurities,
a first drain area electrically connected to the first drain electrode, the first drain area being doped with impurities,
a first channel area disposed between the first source area and the first drain area, the first channel area overlapping the first gate electrode, and
an ohmic bridge area disposed between the first channel area and each of the first source area and the first drain area, the ohmic bridge area has a first length, and
the second semiconductor layer of each of the plurality of second transistors includes:
a second source area electrically connected to the second source electrode, the second source area being doped with impurities,
a second drain area electrically connected to the second drain electrode, the second drain area being doped with impurities, and
a second channel area disposed between the second source area and the second drain area, the second channel area overlapping the second gate electrode, and
an ohmic bridge area disposed between the second channel area and each of the second source area and the second drain area, the ohmic bridge area has a second length that is longer than the first length.

16. The display device of claim 11, wherein
each of the plurality of first transistors further comprising a resistive element disposed between a supply line of any one of the plurality of external signals and the first gate electrode, and
each of the plurality of second transistors being absent of the resistive element disposed between any of the at least one specific node and the second gate electrode.

17. The display device of claim 16, wherein in each of the plurality of first transistors, the resistive element includes an impurity semiconductor, the impurity semiconductor and the first semiconductor layer being disposed on a same layer, the impurity semiconductor being doped with impurities.

18. The display device of claim 17, wherein in each of the plurality of first transistors, the resistive element is electrically connected to the supply line through a first contact hole, and is electrically connected to the first gate electrode through a second contact hole.

19. The display device of claim 11, wherein a channel length of the first semiconductor layer of each of the plurality of first transistors is shorter than a channel length of the second semiconductor layer of each of the plurality of second transistors.

20. The display device of claim 11, wherein a channel width of the first semiconductor layer of each of the plurality of first transistors is greater than a channel width of the second semiconductor layer of each of the plurality of second transistors.

* * * * *